United States Patent
Gau et al.

(10) Patent No.: US 12,398,258 B2
(45) Date of Patent: Aug. 26, 2025

(54) POLYAMIDE-BASED PRODUCTS

(71) Applicant: ENVALIOR DEUTSCHLAND GMBH, Düsseldorf (DE)

(72) Inventors: Elisabeth Gau, Dormagen (DE); Jan Caudal, Pulheim (DE); Marc Rudolf, Cologne (DE); Detlev Joachimi, Krefeld (DE); Jochen Endtner, Cologne (DE); Leif Arne Koerte, Minden (DE); Matthias Bienmüller, Krefeld (DE)

(73) Assignee: ENVALIOR DEUTSCHLAND GMBH, Düsseldorf (DE)

( * ) Notice: Subject to any disclaimer, the term of this patent is extended or adjusted under 35 U.S.C. 154(b) by 0 days.

(21) Appl. No.: 18/713,959

(22) PCT Filed: Nov. 7, 2022

(86) PCT No.: PCT/EP2022/081012
§ 371 (c)(1),
(2) Date: May 28, 2024

(87) PCT Pub. No.: WO2023/099128
PCT Pub. Date: Jun. 8, 2023

(65) Prior Publication Data
US 2024/0425679 A1  Dec. 26, 2024

(30) Foreign Application Priority Data
Dec. 1, 2021 (EP) ..................... 21211672

(51) Int. Cl.
| C08K 13/04 | (2006.01) |
| C08K 3/32 | (2006.01) |
| C08K 5/18 | (2006.01) |
| C08K 7/14 | (2006.01) |

(52) U.S. Cl.
CPC ............. C08K 13/04 (2013.01); C08K 3/32 (2013.01); C08K 5/18 (2013.01); C08K 7/14 (2013.01)

(58) Field of Classification Search
CPC . C08K 13/04; C08K 3/32; C08K 5/18; C08K 7/14
See application file for complete search history.

(56) References Cited

U.S. PATENT DOCUMENTS

| 5,256,718 | A | * | 10/1993 | Yamamoto | ............. | C08K 5/521 |
| | | | | | | 524/412 |
| 5,945,469 | A | | 8/1999 | Heath et al. | | |
| 7,115,677 | B2 | | 10/2006 | Harashina et al. | | |
| 2011/0196080 | A1 | | 8/2011 | Matsuoka et al. | | |
| 2019/0136053 | A1 | * | 5/2019 | Takamasa | ............. | C08K 3/013 |
| 2022/0177701 | A1 | * | 6/2022 | Cremer | .................. | C08L 77/06 |
| 2022/0185994 | A1 | | 6/2022 | Cremer et al. | | |

FOREIGN PATENT DOCUMENTS

| CN | 102618027 | | 8/2012 |
| CN | 103554905 | | 2/2014 |
| CN | 111117218 | | 5/2020 |
| DE | 102011084519 | A1 | 4/2013 |
| EP | 0113229 | B1 | 9/1987 |
| EP | 1452567 | | 9/2004 |
| EP | 2180018 | | 4/2010 |
| EP | 3919562 | A1 | 12/2021 |
| GB | 2584307 | A | 12/2020 |
| JP | 2009-185151 | | 8/2009 |
| JP | 2018-135444 | | 8/2018 |
| JP | 2022-522415 | | 4/2022 |
| JP | 2014-12773 | | 1/2023 |
| JP | 2024-542732 | | 11/2024 |
| WO | WO 03/046083 | | 6/2003 |
| WO | 2005033185 | A1 | 4/2005 |
| WO | 2009003976 | A1 | 1/2009 |
| WO | WO 2009/017043 | | 2/2009 |
| WO | 2013083247 | A1 | 6/2013 |
| WO | WO 2018/123563 | | 7/2018 |
| WO | 2018202791 | A1 | 11/2018 |
| WO | WO 2018/202791 | | 11/2018 |
| WO | 2020169547 | A1 | 8/2020 |
| WO | WO 2020/239963 | | 12/2020 |

OTHER PUBLICATIONS

English machine translation of JP 2014-012773A. (Year: 2014).*
International Search Report and Written Opinion of the ISA for PCT/EP2022/081012, mailed Feb. 17, 2023, 15 pages.
Notice of Reasons for Rejection, issued Nov. 5, 2024 for JP Appln. No. 2024-532722 (published Nov. 15, 2024 as JP2024-542732), in Japanese with translation.

* cited by examiner

*Primary Examiner* — John E Uselding
(74) *Attorney, Agent, or Firm* — Nixon & Vanderhye, P.C.

(57) ABSTRACT

Compositions and products formed thereof are based on glass fiber-reinforced polyamide admixed with at least one secondary aromatic amine, at least one phosphinic acid derivative and bis(2,4-di-t-butylphenyl)pentaerythritol diphosphate in amounts to improve ageing behavior in the form of improved preservation of the elongation at break and impact toughness, improved color preservation or improved color stability, and simultaneously improved UV stability after thermal ageing by comparison with products based on glass fiber-reinforced polyamide with such a mixture.

12 Claims, No Drawings

POLYAMIDE-BASED PRODUCTS

CROSS-REFERENCE TO RELATED APPLICATIONS

This application is the U.S. national phase of International Application No. PCT/EP2022/081012 filed Nov. 7, 2022, which designated the U.S. and claims priority to EP 21211672.7 filed Dec. 1, 2021, the entire contents of each of which are hereby incorporated by reference.

The present invention relates to products based on glass-fiber-reinforced polyamide and to the use of mixtures containing at least one secondary aromatic amine, at least one phosphinic acid derivative, and bis(2,4-di-t-butylphenyl) pentaerythritol diphosphite and the use of the latter as an additive to improve the aging behavior in the form of an improved retention of the elongation at fracture and the impact resistance, an improved color retention, or an improved color stability, as well as simultaneously improved UV stability after thermal aging in comparison to products based on glass-fiber-reinforced polyamide without this mixture.

Elasticity and crack resistance are reasons for the wide-ranging use of polyamides. Because of their strength and stiffness and their resistance to organic solvents, such as alcohols, acetone, benzene, and fuels, they are also of interest for other industrial sectors, above all for the automotive sector. Fuel hoses made of polyamides are currently as indispensable for motor vehicle construction, as are many other components made of polyamides, which replace metals, such as aluminum or steel, and thus enable significant weight savings with uniform properties.

According to https://de.wikipedia.org/wiki/Polyamide, polyamides have a relatively low glass temperature. The glass temperatures for polyamide 6, polyamide 6.6, polyamide 6.10, polyamide 6.12, polyamide 11, or polyamide 12 are all in the range of 37 to 60° C. To achieve a higher stiffness and hardness and better chemical and hydrolysis resistance, reinforcing materials, in particular glass fibers, are used in polyamides. Moreover, one of the disadvantages of polyamides, the comparatively high water absorption, can be significantly reduced by adding glass fibers. In addition to increasing strength and modulus of elasticity, the continuous service temperature also increases significantly due to the use of glass fibers, which significantly expands the possible uses of polyamides, in particular in the automotive sector. The usage limits extend, depending on the chemical structure of the polyamides, from approximately −30° C. for polyamide 11 or −70° C. for polyamide 12 to over +100° C.; in the short term, temperatures from approximately 140 to 180° C. and above are possible, even up to 280° C. in the case of polyamide 46.

While the internal combustion engine represented the dominant drive concept over many years, new requirements with respect to the material selection also result in the course of the search for alternative drive concepts. One essential role is played here by electromobility, in which the internal combustion engine is partially replaced in hybrid vehicles or completely replaced in electric vehicles by one or more electric motors, which typically acquire their electrical energy from batteries or fuel cells. While conventional vehicles having an internal combustion engine as the sole drive typically manage with a vehicle electrical system of 12 V, significantly higher voltages are required in hybrid and electric vehicles having electric motors as the drive unit. This represents an additional potential hazard to be taken seriously for the direct area and the immediate surroundings of such voltage-conducting components, which increasingly plays a role in technical specifications or also normatively. The clear identification of these high-voltage hazard areas plays an essential role here in order to avoid inadvertent contact with a human, in particular a driver or mechanic, in this way, wherein the clear color identification, in particular the color identification in orange, of products based on polyamide in turn plays a particularly important role in high-voltage applications. The German Social Accident Insurance DGUV describes in their information BGI/GUV-I 8686 on "Qualifizierung für Arbeiten an Fahrzeugen mit Hochvoltsystemen [Qualification for work on vehicles having high-voltage systems]" describes the term high voltage, in particular in hybrid and fuel cell technology and electric vehicles, comprising voltages >60 V and <1500 V for the DC voltage range and >30 V and 1000 V for AC voltage.

However, polyamide-based products are subject to appearances of degradation under the effect of external influences, in particular light, UV rays, heat, or rough weather conditions. Appearances of degradation occur in particular as a result of the effect of high temperatures. The result of such appearances of degradation is generally perceived in the form of a loss of the mechanical properties, preferably the impact resistance and the elongation at fracture and in particular as discoloration. However, degradation processes in particular in the form of undesired discolorations are undesired in the case of reinforced and colored polyamide-based products, in particular orange colored polyamide-based products in the high-voltage area, since a clear and uniform color identification is not ensured over the usage period, for example, in motor vehicles.

Applications of polyamide-based products in the automotive sector, preferably applications in electromobility, in particular in the high-voltage area such as charging plugs, also require good impact resistance in addition to requirements such as stiffness in the form of the modulus of elasticity. Polyamide-based products for use in the high-voltage area can thus be subjected to high mechanical forces during installation and removal and in use in the motor vehicle and cannot break in this case. The retention of the impact resistance over the vehicle lifetime also has to be ensured.

The solution of the prior art, according to Kunststoffhandbuch 3/4, Technische Thermoplaste, Polyamide [Plastic handbook 3/4, technical thermoplastics, polyamides], Karl Hansen Verlag, Munich, Vienna, 1998, p. 16 and p. 148-150, for improving the impact resistance of polyamide-based compositions is the use of amorphous plastics such as ABS or elastomers in polyamide-based blends. Polymers, which are used in other polymers such as polyamide to increase the impact resistance, are referred to in technical language as modifiers or impact resistance modifiers and are to be referred to according to the invention as impact resistance modifiers. Impact resistance modifiers suitable for polyamide are ethylene-propylene rubbers (EPM, EPR) or ethylene-propylene-diene rubbers (EPDM), styrene-containing elastomers, e.g., SEBS, SBS, SEPS, or acrylate rubbers. However, nitrile rubbers (NBR, H-NBR), silicone rubbers, EVA, and microgels, as are described in WO 2005/033185 A1, are also suitable as impact resistance modifiers. Studies in the context of the Dissertation of S. Moll on "Untersuchung der Auswirkungen einer thermisch-oxidativen Beanspruchung auf das Emissionsverhalten von ABS und PP und der Korrelation mit dem Alterungsgrad [Study of the effects of a thermal-oxidative stress on the emission behavior of ABS and PP and the correlation with the degree of aging]" from 2016 have shown, however, that poly-(acrylonitrilebutadiene-styrene) "ABS" discolors under thermal-oxidative stress. In addition, it is known to a person skilled in the art that the stiffness in the form of the modulus of elasticity, sometimes also known as the tensile modulus, decreases due to the addition of an impact resistance modifier (Kunststoffhandbuch 3/4, Technische Thermoplaste, Polyamide, [Plastic handbook 3/4, technical thermoplastics, polyamides], Karl Hansen Verlag, Munich, Vienna, 1998, p. 16 and p. 157). Therefore, the impact resistance modifiers described in the prior art and typically to be used in polyamide appear unsuitable, in particular if polyamide-based components identified by color are not supposed to tend toward discolorations.

The impact resistance is calculated as the ratio of impact work and test specimen cross section (unit: $kJ/m^2$). The impact resistance can be determined by various types of the impact bending test, whether according to Charpy to DIN EN ISO 179, or according to Izod to DIN EN ISO 180. The impact resistance is measured in the scope of the present invention according to ISO180-1U on injection-molded test specimens ($80 \cdot 10 \cdot 4$ $mm^3$) at 23° C. in the freshly molded state.

It is known to a person skilled in the art that the glass fiber content has an influence on the impact resistance of a polyamide composition or on products to be produced therefrom (Glasfaserverstärkte Kunststoffe [Glass-fiber-reinforced plastics], P. H. Selden, Springer-Verlag Berlin, Heidelberg, New York, 1967, pages 324 to 325). Therefore, the effect, which improves impact resistance, of an impact resistance modifier or an additive improving the impact resistance can only be compared equal glass fiber content.

The elongation at fracture (unit %) represents an indicator of the deformability of a plastic and is, according to DIN EN ISO 527, the last elongation value recorded before a tension drop to less than or equal to 10% of the strength value takes place in the tensile test. The elongation at fracture is measured in the scope of the present invention according to DIN EN ISO 527 on injection-molded test specimens (170·10·4 $mm^3$, tension rod type 1A) at 23° C. in the freshly molded state.

In summary, the requirements for polyamide-based products in applications in electromobility, in particular in the high-voltage range, are manifold. In addition to increased impact resistance, both the color identification and the mechanical properties such as the impact resistance and the elongation at fracture have to be ensured over the vehicle lifetime. The prior art, of improving the impact resistance by the use of impact resistance modifiers, is not suitable, since these result in discolorations of the polyamide composition or products to be produced therefrom under thermal-oxidative stress.

Compositions according to EP 3 919 562 A1, containing at least one secondary aromatic amine and at least one phosphinic acid derivative are suitable for producing polyamide-based products having improved color stability and improved impact resistance retention after thermal aging. However, these products have inadequate UV stability and the retention of the elongation at fracture after 500 hours thermal aging at 150° C. is unsatisfactory for applications in the motor vehicle sector.

The object of the present invention was therefore to provide glass-fiber-reinforced polyamide-based compositions or products to be produced therefrom, which have good aging behavior in the form of improved color retention or in the form of improved color stability after hot air aging and at the same time improved UV stability and moreover good aging behavior in the form of a sufficient retention of the impact resistance and above all the elongation at fracture after hot air aging.

Good aging behavior in the form of improved color retention or improved color stability after hot air aging is understood according to the invention to mean that the color distance $\Delta E$ calculated according to DIN EN ISO 11664-4 after hot air aging over 500 hours at 150° C. is less, preferably the color distance $\Delta E$ is in the range of 0 to 20, particularly preferably the color distance $\Delta E$ is in the range of 0 to 15. In the scope of the present invention, a smaller $\Delta E$ value in comparison to the prior art therefore means low color change. If the color were not to change at all after the storage, this would correspond to $\Delta E=0$.

Good aging behavior in the form of improved UV stability is understood according to the invention to mean that the color distance $\Delta E$ calculated according to DIN EN ISO 11664-4 after UV storage according to DIN ISO 4892-2A over 200 hours at 80° C., 340 nm, and 1.55 $W/m^2$ without rain is less, preferably the color distance $\Delta E$ is in the range of 0 to 30, particularly preferably the color distance $\Delta E$ is in the range of 0 to 20. In the scope of the present invention, a smaller $\Delta E$ value in comparison to the prior art therefore means low color change. If the color were not to change at all after the storage, this would correspond to $\Delta E=0$.

Good aging behavior in the form of sufficient retention of the impact resistance after hot air aging is understood according to the invention to mean that the impact resistance of a sample measured according to ISO180-1U after hot air aging over 500 hours at 150° C. does not drop more than 50% in comparison to the time at 0 hours.

Good aging behavior in the form of sufficient retention of the elongation at fracture after hot air aging is understood according to the invention to mean that the elongation at fracture measured according to DIN EN ISO 527 after hot air aging over 500 hours at 150° C. does not drop more than 30% in comparison to the time at 0 hours.

The achievement of this complex object for glass-fiber-reinforced polyamides is the use of mixtures containing at least one secondary aromatic amine, at least one phosphinic acid derivative, and bis(2,4-di-t-butylphenyl)pentaerythritol diphosphite.

The present invention relates to compositions and/or products containing a) at least one polyamide, preferably polyamide 6 or polyamide 66, b) at least one secondary aromatic amine, c) at least one phosphinic acid derivative of the general formula (I),

wherein R stands for a hydrogen atom or for an alkyl, cycloalkyl, or aryl group, and R' stands for an alkali metal, an alkaline earth metal, a metal of the 12th and 13th group of the periodic system of the elements, an ammonium ion, or for a $C_1$-$C_{10}$ alkyl group, d) bis(2,4-di-t-butylphenyl)pentaerythritol diphosphite, and
e) glass fibers,
with the proviso that for 100 parts by mass of component a)
0.1 to 3 parts by mass, preferably 0.3 to 2 parts by mass, particularly preferably 0.35 to 1.5 parts by mass of component b),
0.01 to 3 parts by mass, preferably 0.05 to 2 parts by mass, particularly preferably 0.1 to 1.7 parts by mass of component c),
0.01 to 3 parts by mass, preferably 0.05 to 1 parts by mass, of component d), and
5 to 200 parts by mass, preferably 15 to 160 parts by mass, particularly preferably 30 to 150 parts by mass, of component e) are used.

The ammonium ion $NH_4^+$ for R' in formula (I) is a cation, which forms salts with anions similarly to alkali metal ions. It is the conjugated acid to the base ammonia ($NH_3$).

Surprisingly, glass-fiber-reinforced polyamide compositions or products based thereon according to the invention, containing components b), c), and d), also display, in addition to good aging behavior in the form of improved color retention or improved color stability after hot air aging with at the same time improved UV stability, good aging behavior in the form of improved retention of the impact resistance and the elongation at fracture after hot air aging in comparison to glass-fiber-reinforced polyamide compositions or products based thereon containing components b) and c), but without component d). The manifold above-described requirements for glass-fiber-reinforced polyamide-based products for applications in electromobility are therefore met by the combination of components b) and c) and in addition by bis(2,4-di-t-butylphenyl)pentaerythritol diphosphite.

It is known to a person skilled in the art from P. H. Selden, Glasfaserverstärkte Kunststoffe [Glass-fiber-reinforced plastics], pages 324-325, chapter "Glasfaserverstärkte Thermoplaste" ["glass-fiber-reinforced thermoplastics"] by K. Schlichting, Springer Verlag Berlin 1967 that the glass fiber content has an influence on the impact resistance of a polyamide composition. Since reinforcing materials, in particular glass fibers, themselves therefore influence the impact resistance of polyamides, comparative statements in the scope of the present invention always refer to compositions or products having the same content of reinforcing materials, in particular glass fibers. This statement also applies to methods and uses according to the invention.

The invention furthermore relates to the use of mixtures containing
b) at least one secondary aromatic amine,
c) at least one phosphinic acid derivative of the general formula (I),

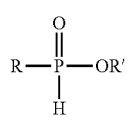
(I)

wherein R stands for a hydrogen atom or for an alkyl, cycloalkyl, or aryl group, and R' stands for an alkali metal, an alkaline earth metal, a metal of the 12th or 13th group of the periodic system of the elements, an ammonium ion, or for a $C_1$-$C_{10}$ alkyl group, and for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or retention of the elongation at fracture measured according to ISO 527 after hot air aging over 500 hours at 150° C. with the proviso that for 100 parts by mass of at least one polyamide reinforced with 5 to 200 parts by mass, preferably 15 to 160 parts by mass, particularly preferably 30 to 150 parts by mass, glass fibers to be used as component e) and to be used as component a), preferably polyamide 6 or polyamide 66,
0.1 to 3 parts by mass, preferably 0.3 to 2 parts by mass, particularly preferably 0.35 to 1.5 parts by mass of component b),
0.01 to 3 parts by mass, preferably 0.05 to 2 parts by mass, particularly preferably 0.1 to 1.7 parts by mass of component c), and
0.01 to 3 parts by mass, preferably 0.05 to 1 parts by mass, of component d) are used.

Finally, the invention relates to a method for reducing a color change ΔE calculated according to DIN EN ISO 11664-4 over 500 hours at 150° C. and/or for reducing a color change ΔE calculated according to DIN EN ISO 11664-4 after UV radiation according to DIN ISO 4892-2A over 200 hours at 80° C., 340 nm, and 1.55 W/m² without rain and/or for retaining the impact resistance to be determined according to ISO180-1U and/or for retaining the elongation at fracture to be determined according to ISO 527 after hot air aging over 500 hours at 140° C., in that mixtures containing
b) at least one secondary aromatic amine,
c) at least one phosphinic acid derivative of the general formula (I),

(I)

wherein R stands for a hydrogen atom or for an alkyl, cycloalkyl, or aryl group, and R' stands for an alkali metal, an alkaline earth metal, a metal of the 12th or 13th group of the periodic system of the elements, an ammonium ion, or for a $C_1$-$C_{10}$ alkyl group, and
d) bis(2,4-di-t-butylphenyl)pentaerythritol diphosphite,
are used in glass-fiber-reinforced polyamide-based products with the proviso
that for 100 parts by mass of at least one polyamide to be used as component a), preferably polyamide 6 or polyamide 66, and 5 to 200 parts by mass, preferably 15 to 160 parts by mass, particularly preferably 30 to 150 parts by mass of glass fibers to be used as component e),
0.1 to 3 parts by mass, preferably 0.3 to 2 parts by mass, particularly preferably 0.35 to 1.5 parts by mass of component b),
0.01 to 3 parts by mass, preferably 0.05 to 2 parts by mass, particularly preferably 0.1 to 1.7 parts by mass of component c), 0.01 to 3 parts by mass, preferably 0.05 to 1 parts by mass, of component d) are used.

In the case of the uses and methods according to the invention, the ammonium ion $NH_4^+$ for R' in formula (I) is a cation, which forms salts with anions similarly to alkali metal ions. It is the conjugated acid to the base ammonia ($NH_3$).

For clarification, it is to be noted that in the scope of the present invention with respect to the compositions according to the invention, the products according to the invention, the uses according to the invention, and the methods according to the invention, the test for impact resistance according to ISO 180-1U (Izod) and the test of the elongation at fracture according to ISO 527 was carried out and is to be carried out on injection-molded test specimens defined according to DIN EN ISO 1874-2 in the freshly molded state at 23° C. The freshly molded state, also "dry as molded", is defined in DIN EN ISO 1874-2.

For clarification, it is moreover to be noted that in the scope of the present invention the test of the aging behavior with respect to the compositions according to the invention, the products according to the invention, the uses according to the invention, and the methods according to the invention in the form of a retention of the impact resistance was carried out by storing injection-molded test specimens defined according to DIN EN ISO 1874-2 in a material testing cabinet of the model Binder FP115 with circulating air at temperatures of 150° C. over 500 hours. The impact resistance was therefore determined in the scope of the present invention on the test specimens produced in the scope of the present invention both before (in the freshly molded state) and after the storage according to ISO 180-1U at 23° C. and the differential value was ascertained. The elongation at fracture was accordingly determined in the scope of the present invention on these test specimens both before (in the freshly molded state) and also after the thermal aging according to ISO 527 and the differential value was ascertained.

The Lab color space (also: CIELAB, CIEL*a*b*, Lab colors) describes all perceptible colors. It uses a three-dimensional color space, in which the brightness value L* is perpendicular to the color plane (a,b). The L* axis describes the brightness (luminance) of the color with values from 0 to 100. In the illustration, this is at the zero point perpendicular to the a*b* plane. It can also be referred to as the neutral gray axis, because all achromatic colors (grayscales) are contained between the endpoints black (L*=0) and white (L*=100). In analogy to the complementary color theory of Ewald Hering, the a coordinate specifies the color type and color intensity between green and red and the b coordinate specifies the color type and the color intensity between blue and yellow. The greater the positive a and b and the smaller the negative a and b values, the more intensive the color tone. If a=0 and b=0, an achromatic color tone is present on the brightness axis. In the typical software implementations, L* can assume values between 0 and 100 and a and b can be varied between −128 and 127. The discoloration of polymer-based products by the oxidative damage of the polymer matrix can be determined by the measurement of the color distance ΔE over the storing time at high temperature. The color distance ΔE between two color stimuli is calculated according to the equation $\Delta E=[(\Delta L^*)^2+(\Delta a^*)^2+(\Delta b^*)^2]^{1/2}$ according to DIN EN ISO 11664-4. For clarification, it is therefore also to be noted that in the scope of the present invention, the testing of the aging behavior with respect to the compositions according to the invention, the products according to the invention, the uses according to the invention, and the methods according to the invention in the form of improved color retention/improved color stability was carried out by storing injection-molded slabs of 60 mm·40 mm·4 mm in a material testing cabinet of the model Binder FP115 with circulating air at temperatures of 150° C., referred to hereinafter as hot air aging. As the measure of the discoloration, in the scope of the present invention, the color distance ΔE of injection-molded products based on polymer compositions according to the invention is determined before and after hot air aging via the measurement of the color values L*a*b*.

$$\Delta E = \left[(\Delta L^*)^2 + (\Delta a^*)^2 + (\Delta b^*)^2\right]^{1/2}$$

Therefore, according to the invention, good aging behavior in the form of improved color retention or improved color stability after hot air aging is distinguished in that the resulting color change ΔE is less. The color values L*a*b* of the specimens are determined in the scope of the present invention on panels of the size 60 mm·40 mm·4 mm and the color distance ΔE is calculated therefrom according to DIN EN ISO 11664-4. Less also means with respect to the use or the method that the color distance ΔE is preferably in the range of 0 to 20, in particular is in the range of 0 to 15. A small ΔE value means a low color change in the scope of the present invention. If the color were not to change at all after the storage, ΔE=0 would be the result.

For clarification, it is also to be noted that in the scope of the present invention, the testing of the aging behavior with respect to the compositions according to the invention, the products according to the invention, the uses according to the invention, and the methods according to the invention in the form of improved UV stability in comparison to glass-fiber-reinforced polyamide-based products containing components b) and c) but without component d) was carried out by storing injection-molded slabs of 60 mm·40 mm·4 mm in a QUV rapid weathering device from Q-Lab according to DIN ISO 4892-2A over 200 hours at 80° C., 340 nm, and 1.55 W/m² without rain, referred to in abbreviated form hereinafter as UV storage. As the measure of the discoloration, in the scope of the present invention, the color distance ΔE of injection-molded products based on polymer compositions according to the invention is determined before and after UV storage of 200 hours by the measurement of the color values L*a*b*.

$$\Delta E = \left[(\Delta L^*)^2 + (\Delta a^*)^2 + (\Delta b^*)^2\right]^{1/2}$$

Therefore, according to the invention, good aging behavior in the form of improved UV stability after UV storage in a QUV rapid weathering device is distinguished in that the resulting color change ΔE is less in comparison to polyamide-based products without component d) and the color distance ΔE is in the range of 0 to 30, particularly preferably is in the range of 0 to 20. Less also means with respect to the use or the method that the color distance ΔE is preferably in the range of 0 to 30, in particular is in the range of 0 to 20.

Good aging behavior in the form of a sufficient retention of the impact resistance after hot air aging also means with respect to the use or the method that the impact resistance of a sample measured according to ISO180-1U after hot air aging over 500 hours at 150° C. does not drop more than 50% in comparison to the time at 0 hours.

Good aging behavior in the form of a sufficient retention of the elongation at fracture after hot air aging also means with respect to the use or the method that the elongation at fracture of a sample measured according to ISO 527 after hot air aging over 500 hours at 150° C. does not drop more than 30% in comparison to the time at 0 hours.

For clarification, it is furthermore to be noted that the scope of the present invention with respect to the compositions according to the invention, the products according to the invention, the uses according to the invention, and the methods according to the invention comprises all listed definitions and parameters mentioned generally or in preferred ranges in any combinations. This in particular also relates to the quantity specifications to be used of the individual components in the methods and uses claimed in the scope of the present application. The norms mentioned in the scope of this application refer to the version applicable on the application date of this invention. Unless indicated otherwise, percentage specifications are weight percents.

PREFERRED EMBODIMENTS

In a further preferred embodiment, the invention relates to compositions and/or reinforced polyamide-based products containing, in addition to components a), b), c), d), and e), at least one flame retardant as component f) in 3 to 100 parts by mass, preferably in 5 to 80 parts by mass, particularly preferably in 10 to 50 parts by mass, each in relation to 100 parts by mass of component a).

For clarification, it is to be noted that in the scope of the present invention, all flame retardants to be used as component f) as well as the quantity specifications mentioned here relate to both the compositions and polyamide-based products to be produced therefrom, in particular polyamide-based products in high voltage applications, and are to be applied to the uses and methods according to the invention.

In a further embodiment, the invention relates to compositions and/or reinforced polyamide-based products also containing, in addition to components a), b), c), d), e), and f) or instead of f), at least one further additive g) different from components b), c), d), e), and f), in 0.01 to 80 parts by mass, preferably in 0.05 to 50 parts by mass, particularly preferably in 0.1 to 30 parts by mass, each in relation to 100 parts by mass of component a).

For clarification, it is to be noted that in the scope of the present invention, all additives to be used as component g) as well as the quantity specifications mentioned here relate to both the polyamide-based compositions and polyamide-based products to be produced therefrom, in particular polyamide-based products in high voltage applications, and are to be applied to the uses and methods according to the invention.

Component a)

The polyamides to be used according to the invention as component a) can be produced according to various methods and synthesized from different building blocks. A variety of methods have become known for the production of polyamides, wherein depending on the desired final product, different monomer building blocks, various chain regulators for setting a desired molecular weight, or also monomers having reactive groups for post treatments intended later can be used.

The technically relevant methods for producing polyamides usually run via the polycondensation in the melt. The hydrolytic polymerization of lactams is also understood as polycondensation in this context.

Aliphatic and/or aromatic dicarboxylic acids such as adipic acid, 2,2,4- and 2,4,4-trimethyladipic acid, azelaic acid, sebazic acid, isophthalic acid, terephthalic acid, aliphatic and/or aromatic diamines such as tetramethylene diamine, hexamethylene diamine, 1,9-nonanediamine, 2,2,4- and 2,4,4-trimethylhexamethylene diamine, isomeric diaminodicyclohexylmethane, diaminodicyclohexylpropane, bisamino-methylcyclohexane, phenylene diamine, xylylene diamine, amino carboxylic acids such as aminocapronic acid, and the corresponding lactams come into consideration as educts. Caprolactams, in particular ε-caprolactam, are particularly preferably used. Copolyamides made of several of the mentioned monomers are included.

Preferred polyamides are partially crystalline polyamides, which can be produced starting from diamines and dicarboxylic acids and/or lactams having at least 5 ring members or corresponding amino acids. The partially crystalline polyamides preferably to be used according to the invention are distinguished according to DE 10 2011 084 519 A1 by a melt enthalpy of greater than 25 J/g, measured using the DSC method according to ISO 11357 during the second heating and integration of the melt peak.

Polyamide 6, polyamide 6.6, polyamide 4.6, and/or partially aromatic copolyamides are used as particularly preferred polyamides. Preferred partially aromatic copolyamides are PA6T/6, PA6T/66, PA6T/6I, or PA6T/6I/66.

The designation of the polyamides used in the scope of the present application corresponds to international norm ISO 1874-1, wherein the first number(s) specify/specifies the C atomic number of the starting diamine and the last number(s) specify/specifies the C atomic number of the dicarboxylic acid. If only one number is specified, as in the case of PA6, this means that the synthesis started from an α,ω-amino carboxylic acid or the lactam derived therefrom, in the case of PA 6 thus ε-caprolactam.

The polyamide 6 [CAS No. 25038-54-4] particularly preferably to be used as component a) according to the invention preferably has a viscosity number to be determined according to ISO 307 in 0.5 wt. % solution in 96 wt. % sulfuric acid at 25° C. in the range of 80 to 180 ml/g, particularly preferably in the range of 85 to 170 ml/g, and very particularly preferably in the range of 90 to 160 ml/g. Polyamide 6 preferably to be used according to the invention as component a) is available, for example, as Durethan® B29 from Lanxess Deutschland GmbH, Cologne.

A polyamide 66 [CAS No. 32131-17-2] particularly preferably to be used as component a) preferably has a viscosity number to be determined according to ISO 307 in 0.5 wt. % solution in 96 wt. % sulfuric acid at 25° C. in the range of 80 to 180 ml/g, very particularly preferably a viscosity number in the range of 85 to 170 ml/g, particularly preferably in the range of 90 to 160 ml/g. Polyamide 66 to be used according to the invention as component a) is available, for example, as Ultramid® A27E01 from BASF SE, Ludwigshafen.

The polyamide to be used according to the invention as component a) can also be used in the mixture with at least one other polyamide or in the form of a copolyamide.

Typical additives, preferably demolding agents, stabilizers, and/or anticaking agents known to a person skilled in the art, can already be admixed in the melt to the polyamide to be used as component a).

Component b)

According to the invention, at least one secondary aromatic amine is used as component b). Secondary aromatic amines of general formula (II) are preferred

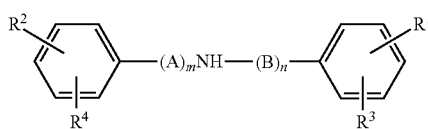

(II)

wherein
m and n each independently of one another stand for 0 or 1,
A and B each independently of one another stand for a tertiary C atom substituted with $C_1$-$C_4$-alkyl or phenyl,
$R^1$ and $R^2$ each independently of one another stand for hydrogen, for a $C_1$-$C_6$-alkyl group in ortho and para position, which can possibly be substituted by 1 to 3 phenyl radicals, or for halogen, carboxyl, or a metal salt of this carboxyl group,
$R^3$ and $R^4$ each independently of one another stand for hydrogen or for a methyl radical in ortho and para position, or stand for a tertiary $C_3$-$C_5$-alkyl group in ortho or para position, which can possibly be substituted by 1 to 3 phenyl radicals.

Preferred radicals A or B in formula (II) are symmetrically substituted tertiary carbon atoms, wherein dimethyl-substituted tertiary carbon is particularly preferred. Tertiary carbons which have 1 to 2 phenyl groups as substituents are also preferred.

Preferred radicals $R^1$ and $R^2$ in formula (II) are t-butyl-substituted or trimethyl-substituted quaternary carbon atoms, in which the methyl groups are preferably replaced by 1 to 3 phenyl groups, particularly preferably are replaced by one phenyl group, or tetramethyl-substituted n-butyl in which the methyl groups can be replaced by phenyl groups. Preferred halogens are bromine and chlorine. Metal salts are preferably those wherein in formula (II) $R^1$ or $R^2$ form carboxyl metal salts.

Preferred radicals $R^3$ and $R^4$ in formula (II) are hydrogen and a trimethyl-substituted quaternary carbon atom in ortho or para position, in which the methyl groups are preferably replaced by 1 to 3 phenyl groups.

Secondary aromatic amines particularly preferred according to the invention are to be selected from the group
4,4'-bis(α,α'-tertiaryoctyl)diphenylamine,
4,4'-bis(α,α'-dimethylbenzyl)diphenylamine,
4-(1,1,3,3-tetramethylbutyl)4'triphenylmethyldiphenylamine,
4,4'-bis(α,α'-p-trimethylbenzyl)diphenylamine,
2,4,4'-tris(α,α'-p-trimethylbenzyl)diphenylamine,
2,2'-dibromo-4,4'-bis(α,α'-dimethylbenzyl)diphenylamine,
4,4'-bis(α,α-dimethylbenzyl)-2-carboxydiphenylamini-nickel-4,4'-bis(α,α-dimethylbenzyl)-diphenylamine,
2-sec-butyl-4,4'-bis(α,α-dimethylbenzyl)diphenylamine,
4,4'-bis(α,α-dimethylbenzyl)-2-(α-methlheptyl)diphenylamine,
2-(α-methylpentyl)4,4'-ditrityldiphenylamine,
4-α,α-dimethylbenzyl-4'-isopropoxydiphenylamine,
2-(α-methylheptyl)-4'-(α,α-dimethylbenzyl)diphenylamine,
2-(α-methylpentyl)-4'-trityldiphenylamine,
4,4'-bis(tertiary-butyl)diphenylamine,

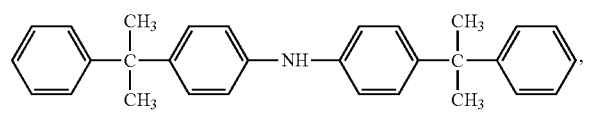

-continued

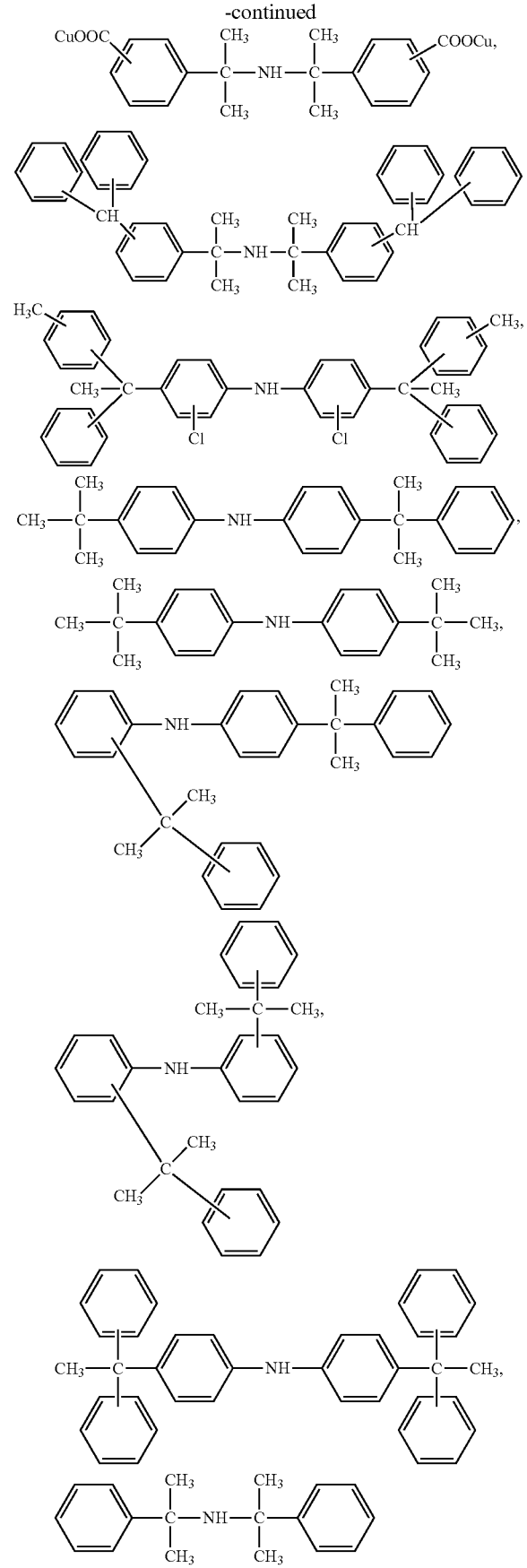

-continued

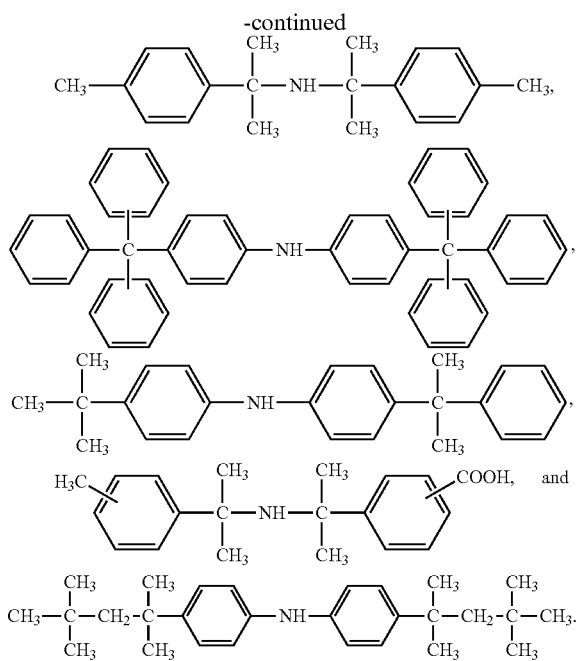

According to the invention, 4,4'-bis(α,α'-dimethylbenzyl) diphenylamine [CAS No. 10081-67-1] is very particularly preferably used as component b), which can be purchased, inter alia, from Rialon under the name Rianox® 445.

Component c)

At least one phosphinic acid derivative of general formula (I) is used as component c)

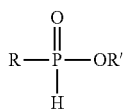

(I)

wherein R stands for a hydrogen atom or for an alkyl, cycloalkyl, or aryl group, and R' stands for an alkali metal, an alkaline earth metal, a metal of the 12th or 13th group of the periodic system of the elements, an ammonium ion, or for a $C_1$-$C_{10}$-alkyl group.

If R in formula (I) represents a hydrogen atom, it is hypophosphoric acid. If R in formula (I) represents an alkyl, cycloalkyl or aryl group, it is a phosphinic acid, wherein the alkyl, cycloalkyl, or aryl group preferably comprises up to 12 carbon atoms.

If R in formula (I) represents an alkyl, cycloalkyl, or aryl group, salts and esters of the phosphinic acid are preferably used. According to the invention, salts of the phosphinic acid are preferably used, wherein these can also be hydrates of the salts. Alkali and alkaline earth metal salts as well as metal salts of the 12th or 13th group of the periodic system of the phosphinic acid are very particularly preferred, wherein these can also be hydrates of the salts.

If R in formula (I) represents a hydrogen atom, it is hypophosphoric acid, of which its salts or esters are preferably used. Alkali metal salts, alkaline earth metal salts, salts with ammonium ion as the cation, and metal salts of the 12th or 13th group of the periodic system of the hypophosphoric acid are particularly preferably used. Alkali metal salts of the hypophosphoric acid are particularly preferably used, wherein these can also be hydrates of the salts.

Sodium hypophosphite [CAS No. 7681-53-0] or sodium hypophosphite monohydrate [CAS No. 10039-56-2] is very particularly preferably used as component c). Sodium hypophosphite and sodium hypophosphite monohydrate can be purchased commercially, inter alia, from Sigma Aldrich.

Component d)

According to the invention, the organic phosphite bis(2,4-di-t-butylphenyl)pentaerythritol diphosphite (antioxidant 626) with the CAS No. 26741-53-7 of formula (III) is used as component d).

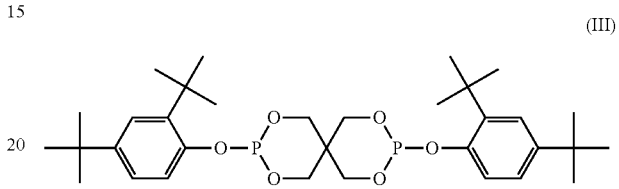

(III)

Component d) is commercially available, inter alia, from Brenntag under the tradename Ultranox™626.

Component e)

Glass fibers are used as component e). With respect to glass fibers, a person skilled in the art distinguishes according to "http://de.wikipedia.org/wiki/Faser-Kunststoff-Verbund" between cut fibers, also referred to as short fibers, having a length in the range of 0.1 to 1 mm, long fibers having a length in the range of 1 to 50 mm, and endless fibers having a length L>50 mm. All length specifications refer to the state before processing to form compositions, molding compounds, or products according to the invention. Short fibers are preferably used in injection molding technology and can be processed directly using an extruder. Long fibers can also still be processed in extruders. They are used to a large extent in fiber spraying. Long fibers are often admixed to thermoset plastics as a filler. Endless fibers are used as rovings or fabric in fiber-reinforced plastics. Products having endless fibers achieve the highest stiffness and strength values. Furthermore, ground glass fibers are offered, the length of which after grinding is typically in the range of 70 to 200 μm.

Glass fibers preferably to be used according to the invention as component e) are cut long glass fibers having a mean starting length to be determined by means of laser diffractometry according to ISO 13320 in the range of 1 to 50 mm, particularly preferably in the range of 1 to 10 mm, very particularly preferably in the range of 2 to 7 mm. The term starting length refers to the state before any incorporation of the glass fibers into components a), b), c), or d).

With respect to laser diffraction particle size determination/laser diffractometry according to the norm ISO 13320, see:

https://de.wikipedia.org/wiki/Laserbeugungs-Partikelgr%C3%B6%C3%9Fenanalyse

Preferred glass fibers to be used as component e) have a mean fiber diameter to be determined by means of laser diffractometry according to ISO 13320 in the range of 7 to 18 μm, particularly preferably in the range of 9 to 15 μm.

The glass fibers to be used as component e) are finished in a preferred embodiment with a suitable slurry system or an adhesion promoter or adhesion promoter system. A slurry system or an adhesion promoter based on silane is preferably used. Particularly preferred adhesion promoters based on silane for the treatment of component e), in particular for the treatment of glass fibers, are silane compounds of general formula (IV)

wherein
X stands for NH$_2$, carboxyl, HO, or

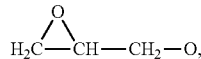

q in formula (IV) stands for an integer from 2 to 10, preferably 3 to 4,
r in formula (IV) stands for an integer from 1 to 5, preferably 1 to 2, and
k in formula (IV) stands for an integer from 1 to 3, preferably 1.

Particularly preferred adhesion promoters are silane compounds from the group aminopropyltrimethoxysilane, aminobutyltrimethoxysilane, aminopropyltriethoxysilane, aminobutyltriethoxysilane and the corresponding silanes, which contain as substituent X a glycidyl group or a carboxyl group, wherein carboxyl groups are in particular very particularly preferred.

For the finishing of the glass fibers to be used as component e), the adhesion promoter, preferably the silane compounds according to formula (IV), are preferably used in quantities in the range of 0.05 to 2 wt. %, particularly preferably in quantities in the range of 0.25 to 1.5 wt. %, and very particularly preferably in quantities in the range of 0.5 to 1 wt. %, each in relation to 100 wt. % of component e).

The glass fibers used as component e) can be shorter due to the processing to form the composition or the product in the composition or in the product than the originally used glass fibers. The arithmetic mean value of the glass fiber length to be determined by means of high-resolution x-ray computer tomography after the processing or in the polyamide-based product is thus often only still in the range of 150 μm to 300 μm.

According to "http://www.r-g.de/wiki/Glasfasern", glass fibers are produced in the melt spin method (nozzle drawing, bar drawing, and nozzle blowing methods). In the nozzle drawing method, the hot glass compound flows through hundreds of nozzle holes of a platinum spinning plate with utilization of gravity. The elementary threads can be drawn in unlimited length at a speed of 3-4 km/minute.

A person skilled in the art distinguishes between various types of glass fibers, of which several are listed here for example:

E glass, the most-used material having optimum price-performance ratio (E glass from R&G)
H glass, hollow glass fibers for reduced weight (R&G hollow glass fiber fabric 160 g/m$^2$ and 216 g/m$^2$)
R, S glass, for increased mechanical requirements (S2 glass from R&G)
D glass, borosilicate glass for increased electrical requirements
C glass, having increased chemical resistance
Quartz glass, having high temperature resistance
Further examples are found under "http://de.wikipedia.org/wiki/Glasfaser". E glass fibers have achieved the greatest importance for plastic reinforcement. E stands for electric glass, since it was originally used above all in the electrical industry.

For the production of E glass, glass melts are produced from pure quartz with additives of limestone, kaolin, and boric acid. In addition to silicon dioxide, they contain different amounts of various metal oxides. The composition determines the properties of the products. According to the invention, at least one type of glass fibers from the group E glass, H glass, R, S glass, D glass, C glass, and quartz glass is preferably used, particularly preferably glass fibers made of E glass.

Glass fibers made of E glass are the most widespread reinforcing material. The strength properties correspond to those of metals (such as aluminum alloys), wherein the specific weight of laminates containing E glass fibers is lower than that of the metals. E glass fibers are noncombustible, heatproof up to approximately 400° C., and resistant to most chemical and weather influences.

Component f)

In a preferred embodiment, at least one flame retardant is used as component f). Preferred flame retardants are various mineral flame retardants, nitrogen-containing flame retardants, or phosphorus-containing flame retardants.

Among the mineral flame retardants to be used as component f), magnesium hydroxide is particularly preferred. Magnesium hydroxide [CAS No. 1309-42-8] can be contaminated due to its origin and method of production. Typical contaminants are, e.g., species containing silicon, iron, calcium, and/or aluminum, which can be intercalated, for example, in the form of oxides in the magnesium hydroxide crystals. The magnesium hydroxide to be used as a mineral flame retardant can be unslurried or else provided with a slurry. A slurry promotes the mechanical bond between plastic (matrix) and the component to be provided with slurry in a manner that influences quality. Preferably, the magnesium hydroxide preferably to be used as a mineral flame retardant is provided with slurries based on stearates or aminosiloxanes, particularly preferably with aminosiloxanes. Magnesium hydroxide preferably to be used as a mineral flame retardant has a mean particle size d50 to be determined by means of laser diffractometry according to ISO 13320 in the range of 0.5 μm to 6 μm, wherein a d50 in the range of 0.7 μm to 3.8 μm is preferred, and a d50 in the range of 1.0 μm to 2.6 μm is particularly preferred.

Mineral flame retardants preferred according to the invention are magnesium hydroxide types, in particular Magnifin® H5IV from Martinswerk GmbH, Bergheim, Germany or Hidromag® Q2015 TC from Penoles, Mexico City, Mexico.

Preferred nitrogen-containing flame retardants to be used as component e) are the reaction products of trichlorotriazine, piperazine, and morpholine according to CAS No. 1078142-02-5, in particular MCA PPM Triazin HF from MCA Technologies GmbH, Biel-Benken, Switzerland, furthermore melamine cyanurate and condensation products of melamine, in particular melem, melam, melon or higher-condensed compounds of this type. Preferred inorganic nitrogen-containing compounds are ammonium salts.

Furthermore, salts of aliphatic and aromatic sulfonic acids and mineral flame retardant additives, in particular aluminum hydroxide or calcium-magnesium carbonate hydrates (DE-A 4 236 122) can also be used.

Furthermore, flame retardant synergists from the group of metal compounds containing oxygen, nitrogen, or sulfur come into consideration for the use as component f). Zinc-free compounds are preferred here, in particular molybdenum oxide, magnesium oxide, magnesium carbonate, calcium carbonate, calcium oxide, titanium nitride, magnesium nitride, calcium phosphate, calcium borate, magnesium borate, or the mixtures thereof.

In an alternative embodiment, however—if it is required—zinc-containing compounds can also be used as component f). These preferably include zinc oxide, zinc borate, zinc stannate, zinc hydroxy stannate, zinc sulfide, and zinc nitride, or the mixtures thereof.

Preferred phosphorus-containing flame retardants to be used as component f) are organic metal phosphinates, aluminum salts of phosphonic acid, red phosphorus, inorganic metal hypophosphites, metal phosphonates, derivatives of 9,10-dihydro-9-oxa-10-phosphaphenanthrene-10-oxides (DOPO derivatives), resorcinol-bis-(diphenylphosphate) (RDP) including oligomers, bisphenol-A-bis-diphenylphosphate (BDP) including oligomers, melamine pyrophosphate, melamine polyphosphate, melamine-poly (aluminum phosphate), melamine-poly (zinc phosphate), or phenoxyphosphazene oligomers and the mixtures thereof.

One preferred organic metal phosphinate is aluminum-tris(diethylphosphinate). One preferred inorganic metal hypophosphite is aluminum hypophosphite.

Further flame retardants to be used as component f) are carbon formers, particularly preferably phenol-formaldehyde resins, polycarbonates, polyimides, polysulfones, polyether sulfones, or polyether ketones, as well as anti-dripping agents, in particular tetrafluoroethylene polymers.

The flame retardants to be used as component f) can be added in pure form, and via master batches or compactates of component a).

In an alternative embodiment, however, halogenated flame retardants can also be used as component f) flame retardant—if it is required in consideration of the disadvantages due to the loss of the freedom from halogen of the flame retardants. Preferred halogenated flame retardants are commercially available organic halogen compounds, particularly preferably ethylene-1,2-bistetrabromo-phthalimide, decabromodiphenylethane, tetrabromobisphenol-A-epoxy oligomer, tetrabromo-bisphenol-A-oligocarbonate, tetrachlorobisphenol-A-oligocarbonate, polypenta-bromobenzyl-acrylate, brominated polystyrene or brominated polyphenylene ethers, which can be used alone or in combination with synergists, wherein brominated polystyrene is particularly preferred among the halogenated flame retardants. Brominated polystyrene is preferably used here in 10-30 wt. %, particularly preferably in 15-25 wt. %, each in relation to the total composition, wherein at least one of the other components is reduced enough that the sum of all weight percents is always 100.

In a further alternative embodiment, antimony trioxide and antimony pentoxide can also be used as flame retardant synergists, however—if required and in consideration of the disadvantages described at the outset with respect to the hazard classification H351.

Brominated polystyrene is commercially available in diverse product qualities. Examples of this are, for example, Firemaster® PBS64 from Lanxess, Cologne, Germany and Saytex® HP-3010 from Albemarle, Baton Rouge, USA.

Among the flame retardants to be used as component f), aluminum-tris(diethylphosphinate)] [CAS No. 225789-38-8] and the combination of aluminum-tris(diethylphosphinate) and melamine polyphosphate or the combination of aluminum-tris(diethylphosphinate) and at least one aluminum salt of phosphonic acid are very particularly preferred, wherein the latter combination is preferred in particular.

In the case of the combinations of aluminum-tris(diethylphosphinate) and melamine polyphosphate or of aluminum-tris(diethylphosphinate) and at least one aluminum salt of phosphonic acid, the proportion of aluminum-tris(diethylphosphinate) is preferably in the range of 40 to 90 parts by weight, particularly preferably in the range of 50 to 80 parts by weight, very particularly preferably in the range of 60 to 70 parts by weight, each in relation to 100 parts by weight of the combination of aluminum-tris(diethylphosphinate) and melamine polyphosphate or the combination of aluminum-tris(diethylphosphinate) and at least one aluminum salt of phosphonic acid.

The aluminum-tris(diethylphosphinate) particularly preferably to be used as component f) is known to a person skilled in the art as Exolit® OP1230 or Exolit® OP1240 from Clariant International Ltd. Muttenz, Switzerland. Melamine polyphosphate is commercially available in diverse product qualities. Examples of this are, for example, Melapur® 200/70 from BASF, Ludwigshafen, Germany and Budit® 3141 from Budenheim, Budenheim, Germany.

Preferred aluminum salts of phosphonic acid to be used as component f) are selected from the group
primary aluminum phosphonate $[Al(H_2PO_3)_3]$,
basic aluminum phosphonate $[Al(OH)H_2PO_3)_{2-2}H_2O]$,
$Al_2(HPO_3)_3 \cdot x\, Al_2O_3 \cdot nH_2O$ with x in the range of 2.27 to 1 and n in the range of 0 to 4,
$Al_2(HPO_3)_3 \cdot (H_2O)_q$ of general formula (IV) with q in the range of 0 to 4, in particular aluminum phosphonate tetrahydrate $[Al_2(HPO_3)_3 \cdot 4H_2O]$ or secondary aluminum phosphonate $[Al_2(HPO_3)_3]$,
$Al_2M_z(HPO_3)_y(OH)_v \cdot (H_2O)$, of general formula (V), wherein M denotes alkali metal ion(s) and z is in the range of 0.01 to 1.5, y is in the range of 2.63-3.5, v is in the range of 0 to 2, and w is in the range of 0 to 4, and
$Al_2(HPO_3)_u(H_2PO_3)_t \cdot (H_2O)_s$ of general formula (VI), wherein u is in the range of 2 to 2.99, t is in the range of 2 to 0.01, and s is in the range of 0 to 4,
wherein in formula (V) z, y, and v and in formula (VI) u and t can only assume numbers such that the corresponding aluminum salt of the phosphonic acid is uncharged as a whole.

Preferred alkali metals M in formula (V) are sodium and potassium.

The described aluminum salts of phosphonic acid can be used individually or in a mixture here.

Aluminum salts of phosphonic acid particularly preferably to be used as component f) are selected from the group
primary aluminum phosphonate $[Al(H_2PO_3)_3]$,
secondary aluminum phosphonate $[Al_2(HPO_3)_3]$,
basic aluminum phosphonate $[Al(OH)H_2PO_3)_2 \cdot 2H_2O]$,
aluminum phosphonate tetrahydrate $[Al_2(HPO_3)_3 \cdot 4H_2O]$, and
$Al_2(HPO_3)_3 \cdot x\, Al_2O_3 \cdot nH_2O$ with x in the range of 2.27 to 1 and n in the range of 0 to 4.

Secondary aluminum phosphonate $Al_2(HPO_3)_3$ [CAS No. 71449-76-8] and secondary aluminum phosphonate tetrahydrate $Al_2(HPO_3)_3 \cdot 4H_2O$ [CAS No. 156024-71-4] are very particularly preferred; in particular, secondary aluminum phosphonate $Al_2(HPO_3)_3$ is preferred.

The production of aluminum salts of phosphonic acid to be used according to the invention as component f) is described, for example, in WO 2013/083247 A1. It is typically carried out by reacting an aluminum source, preferably aluminum isopropoxide, aluminum nitrate, aluminum chloride, or aluminum hydroxide, with a phosphorus source, preferably phosphonic acid, ammonium phosphonate, alkali phosphonate, and optionally with a template in a solvent at 20 to 200° C. during a time span of up to 4 days. For this purpose, aluminum source and phosphorus source are mixed, heated under hydrothermal conditions or under reflux, filtered, washed, and dried. Preferred templates here are hexane-1,6-diamine, guanidine carbonate, or ammonia. The preferred solvent is water.

Very particularly preferably, aluminum-tris(diethylphosphinate) is used in particular as component f). Therefore, compositions and reinforced polyamide-based products also containing, in addition to components a), b), c), d) and e), at least 3 to 100 parts by mass, preferably 5 to 80 parts by mass, particularly preferably 10 to 50 parts by mass aluminum-tris(diethylphosphinate), each in relation to 100 parts by mass of component a), are particularly preferred according to the invention.

Component g)

At least one further additive different from components b), c), d), e), and f) is used as component g). Preferred additives to be used as component g) are antioxidants, thermal stabilizers, UV stabilizers, gamma ray stabilizers, components for reducing the water absorption or hydrolysis stabilizers, antistatic agents, emulsifiers, nucleation agents, softeners, processing aids, lubricants and/or demolding agents, components for reducing the water absorption, anti-caking agents, additives with a chain lengthening effect, coloring agents, colorants, pigments, or laser absorbers. The additives can be used alone or in a mixture or in the form of master batches.

Preferred thermal stabilizers of component g) are sterically hindered phenols, in particular those containing at least one 2,6-di-tert.-butylphenyl group and/or 2-tert.-butyl-6-methylphenyl group, phosphites, hydroquinones, substituted resorcinols, salicylates, benzotriazols and benzophenones, as well as differently substituted representatives of these groups or the mixtures thereof.

In one embodiment, copper salts can also be used as thermal stabilizers. Copper(I) iodide [CAS No. 7681-65-4] and/or copper (triphenylphosphino) iodide [CAS No. 47107-74-4] is preferably used as the copper salt.

The UV stabilizers to be used as component g) used are preferably substituted resorcinols, salicylates, benzotriazols and benzophenones, HALS derivatives ("Hindered Amine Light Stabilizers") containing at least one 2,2,6,6-tetramethyl-4-piperidyl unit or benzophenones. UV stabilizers to be used as component g) are preferably used in 0.01 to 2 parts by mass, particularly preferably 0.1 to 1 parts by mass, each in relation to 100 parts by mass of component a).

In one embodiment, inorganic pigments are preferably used as coloring agents to be used as component g), particularly preferably ultramarine blue, bismuth vanadate [CAS No. 14059-33-7], iron oxide [CAS No. 1309-37-1], titanium dioxide [CAS No. 13463-67-7 (rutile) or CAS No. 1317-70-0 (anatase)], barium sulfate [CAS No. 7727-43-7], zinc sulfide [CAS No. 1314-98-3], or sulfides containing cerium. Preferred sulfides containing cerium are cerium(III) sulfide ($Ce_2S_3$) [CAS No. 12014-93-6], also known as C.I. Pigment Orange 75, or cerium(III) sulfide/lanthanum(III) sulfide ($Ce_2S_3/La_2S_3$) [CAS No. 12014-93-6; CAS No. 12031-49-1] also known as C.I. Pigment Orange 78. Barium sulfate is particularly preferred. Titanium dioxide is also particularly preferred, also referred to as Pigment White 6 or Cl 77891.

Coloring agents also to be used according to the invention as component g) are preferably also pigment systems based on inorganic mixed oxides containing titanium dioxide, tin oxide, and zinc oxide. A pigment system preferably to be used according to the invention as component g), based on inorganic mixed oxides containing titanium dioxide, tin oxide, and zinc oxide, is known from EP 0 113 229 B1, as is its production. The content of EP 0 113 229 B1 is comprised in its entirety by the present description. According to EP 0 113 229 B1, the quantity ratios of the tin, titanium, zinc, and oxygen components in a pigment system to be used according to the invention as component g) are preferably reflected by the general formula (VII)

$$(TiO_2)_c SnO(ZnO)_d (SnO)_e,\qquad\text{(VII)}$$

wherein c is in the range of 0.3 to 6.2, d is in the range of 0.04 to 6.2, and e is in the range of 0 to 7.

Preferably, a pigment system of general formula (VII) to be used as component g) contains 300 to 6000 atomic parts alkali metal residues per million atomic parts of the overall complex or pigment system. A pigment system to be used as component g), based on inorganic mixed oxides from titanium dioxide, tin oxide, and zinc oxide can be used according to the invention individually or in a mixture with at least one further inorganic mixed oxide from titanium dioxide, tin oxide, and zinc oxide.

A pigment system of general formula (VII) of CAS No. 923954-49-8, or C.I. Pigment Orange 82 [CAS No. 2170864-77-2] or C.I. Pigment Yellow 216 [CAS-No. 817181-98-9] is particularly preferably to be used. With respect to the C.I. classification see: https://de.wikipedia.org/wiki/Colour_Index. Pigment Orange 82 can be acquired, for example, under the name Sicopal® Orange K2430 from BASF SE, Ludwigshafen, Germany. Pigment Yellow 216 can be acquired, for example, under the name Orange 10P340 from Shepherd, Gent, Belgium.

In one embodiment, organic coloring agents are preferably used as further coloring agents to be used as component g), particularly preferably phthalocyanines, quinacridones, benzimidazoles, in particular Ni-2-hydroxy-napthyl-benzimidazole [CAS No. 42844-93-9] and/or pyrimidine-azo-benzimidazole [CAS No. 72102-84-2] and/or Pigment Yellow 192 [CAS No. 56279-27-7], moreover perylenes, anthraquinones, in particular C.I. Solvent Yellow 163 [CAS No. 13676-91-0] and phthaloperines, in particular 10,10'-oxy-bis-12H-phthaloperine-12-one [CAS No. 203576-97-0] and 12H-phthaloperine-12-one [CAS No. 6925-69-5], wherein 10,10'-oxy-bis-12H-phthaloperine-12-one is preferred in particular.

In an alternative embodiment—if required—carbon black or nigrosin can also be used as a coloring agent of component g).

In a particularly preferred embodiment, the coloring agents are used according to the invention so that the color-stable, impact-resistant polyamide-based products are colored "orange", wherein color tones which are "similar" in the RAL color system to those of the color numbers RAL2001, RAL2003, RAL2004, RAL2007, RAL2008, RAL2009, RAL2010, and RAL2011 are preferred and those color tones which are "similar" to the color numbers RAL2003, RAL2008, and RAL2011 are very particularly preferred. According to the invention, "orange" is understood as a color tone which is "similar" to a color tone of a color number of the RAL color table beginning with "2". "Similar" color tones are here according to the invention those color tones, the color distance of which in the L*a*b* system have a $\Delta E<20$, preferably a $\Delta E<10$, particularly preferably $\Delta E<5$ to the color of the RAL color table. For explanation of the $\Delta E$ defined in EN ISO 11664-4 see, for example:https://de.wikipedia.org/wiki/Delta_E.

Nucleating agents to be used as component g) are preferably sodium or calcium phenyl phosphinate, aluminum oxide, silicon dioxide, or talcum. Talcum [CAS No. 14807-96-6], in particular microcrystalline talcum, is particularly preferably used as a nucleating agent. Talcum, also referred to as talc, is a layered silicate having the chemical composition $Mg_3[Si_4O_{10}(OH)_2]$, which crystallizes depending on the modification as talc-1A in the triclinic or as talc-2M in the monoclinic crystal system (http://de.wikipedia.org/wiki/Talkum). Talcum to be used according to the invention can be acquired, for example, as Mistron® R10 from Imerys Talc Group, Toulouse, France (Rio Tinto Group).

Copolymers of at least one α-olefin with at least one methacrylic acid ester or acrylic acid ester of an aliphatic alcohol are preferably used as anticaking agents to be used as component g). Copolymers are particularly preferred here in which the α-olefin is synthesized from ethene and/or propene and the methacrylic acid ester or acrylic acid ester contains as the alcohol component linear or branched alkyl groups with 6 to 20 carbon atoms. Acrylic acid 2-ethylhexyl ester is very particularly preferred. Copolymers suitable as anticaking agents are also distinguished, in addition to the composition, by the low molecular weight. Above all, copolymers are accordingly suitable for the polymer compositions according to the invention which have an MFI value measured at 190° C. and a load of 2.16 kg of at least 100 g/10 minutes, preferably of at least 150 g/10 minutes, particularly preferably of at least 300 g/10 minutes. The MFI, melt-flow index, is used to characterize the flow of a melt of a thermoplastic and is subject to the norms ISO 1133 or ASTM D 1238. A copolymer of ethene and acrylic acid 2-ethylhexyl ester with MFI 550 is particularly preferably used as the anticaking agent, known as Lotryl® 37EH550.

Preferably difunctional or multifunctional additives having a branching or chain-lengthening effect are used as chain-lengthening additives to be used as component g), containing at least two functional groups having a branching or chain-lengthening effect per molecule. Low-molecular-weight or oligomeric compounds are preferred as branching or chain-lengthening additives, which have at least two functional groups having a chain-lengthening effect per molecule, which can react with primary and/or secondary amino groups and/or amide groups and/or carboxylic acid groups. Functional groups having a chain-lengthening effect are preferably isocyanates, alcohols, blocked isocyanates, epoxides, maleic acid anhydride, oxazolines, oxazines, oxazolones, wherein epoxides are preferred.

Particularly preferred difunctional or multifunctional additives having a branching or chain-lengthening effect are diepoxides based on diglycidyl ether (bisphenol and epichlorohydrin), based on amino epoxide resin (aniline and epichlorohydrin), based on diglycidyl ester (cycloaliphatic dicarboxylic acids and epichlorohydrin), individually or in mixtures, and 2,2-bis[p-hydroxyphenyl]propane diglycidyl ether, bis[p-(N-methyl-N-2,3-epoxypropylamino)phenyl] methane, as well as epoxidated fatty acid esters of glycerin, containing at least two epoxide groups per molecule.

Particularly preferred difunctional or multifunctional additives having a branching or chain-lengthening effect are glycidyl ethers, very particularly preferably bisphenol A-diglycidyl ether [CAS No. 98460-24-3] or epoxidated fatty acid esters of glycerin, and also very particularly preferably epoxidated soybean oil [CAS No. 8013-07-8] and/or epoxidated linseed oil.

Softeners to be used preferably as component g) are phthalic acid dioctyl ester, phthalic acid dibenzyl ester, phthalic acid butyl benzyl ester, hydrocarbon oils, or N-(n-butyl)benzenesulfonamide.

Lubricants and/or demolding agents to be used as component g) are preferably long-chain fatty acids, in particular stearic acid or behenic acid, the salts thereof, in particular calcium or zinc stearate, and the ester derivatives thereof, in particular those based on pentaerythritol, in particular fatty acid esters of pentaerythritol or amide derivatives, in particular ethylene-bis-stearyl amide, montan waxes, and low-molecular-weight polyethylene or polypropylene waxes.

Montan waxes in the meaning of the present invention are mixtures of straight-chain, saturated carboxylic acids with chain lengths in the range of 28 to 32 carbon atoms.

According to the invention, lubricants and/or demolding agents from the group of esters of saturated or unsaturated aliphatic carboxylic acids with 8 to 40 carbon atoms with aliphatic saturated alcohols or amides of amines with 2 to 40 carbon atoms with unsaturated aliphatic carboxylic acids with 8 to 40 carbon atoms or instead of the carboxylic acids in each case metal salts of saturated or unsaturated aliphatic carboxylic acids with 8 to 40 carbon atoms are particularly preferably used.

Lubricants and/or demolding agents very particularly preferably to be used as component g) are to be selected from the group pentaerythritol tetrastearate [CAS No. 115-83-3], ethylene-bis-stearyl amide, calcium stearate, zinc stearate, and ethylene glycol-dimontanate. Zinc stearate [CAS No. 557-05-1], calcium stearate [CAS No. 1592-23-0], or ethylene-bis-stearyl amide [CAS No. 110-30-5] is particularly preferably used. In particular ethylene-bis-stearyl amide (Loxiol® EBS from Emery Oleochemicals) is particularly preferably used.

Laser absorbers preferably to be used as component f) are selected from the group tin oxide, tin orthophosphate, barium titanate, aluminum oxide, copper hydroxy phosphate, copper orthophosphate, potassium copper diphosphate, copper hydroxide, bismuth trioxide, tin and/or antimony oxide-doped mica, and anthraquinone. Tin oxide is particularly preferred.

In an alternative embodiment, antimony tin oxide, antimony trioxide, or antimony pentoxide can also be used as a laser absorber, alternatively—if it is required in consideration of the disadvantages described at the outset with respect to the hazard classification H351.

The laser absorber can be used directly as a powder or in the form of master batches. Preferred master batches are those based on polyamide and/or polyolefins, preferably polyethylene. The laser absorber is very particularly preferably used in the form of a polyamide 6-based master batch.

The laser absorber can be used individually or as a mixture of multiple laser absorbers. Laser absorbers can absorb laser light of a specific wavelength. In practice, this wavelength is in the range of 157 nm to 10.6 μm. Examples of lasers of these wavelengths are described in WO2009/003976 A1. Preferably, Nd:YAG lasers, using which wavelengths of 1064, 532, 355, and 266 nm can be implemented, and $CO_2$ lasers are used.

Particularly Preferred Compositions/Products

The invention relates in particular to compositions and/or products containing
 a) polyamide 6 or polyamide 66,
 b) 4,4'-bis(α,α'-dimethylbenzyl)diphenylamine,
 c) sodium hypophosphite or sodium hypophosphite monohydrate, d) bis(2,4-di-t-butylphenyl)pentaerythritol 31 iphosphate, and
e) glass fibers,
with the proviso that for 100 parts by mass of component a) 0.1 to 3 parts by mass, preferably 0.3 to 2 parts by mass, particularly preferably 0.35 to 1.5 parts by mass of component b),
0.01 to 3 parts by mass, preferably 0.05 to 2 parts by mass, particularly preferably 0.1 to 1.7 parts by mass of component c),
0.01 to 3 parts by mass, preferably 0.05 to 1 parts by mass, of component d), and
5 to 200 parts by mass, preferably 15 to 160 parts by mass, particularly preferably 30 to 150 parts by mass, of component e) are used.

Preferred Uses

The invention preferably relates to the use of bis(2,4-di-t-butylphenyl)pentaerythritol 31iphosphate for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C.

The invention particularly preferably relates to the use of bis(2,4-di-t-butylphenyl)pentaerythritol 32iphosphate for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C., with the proviso that 0.01 to 3 parts by mass, preferably 0.05 to 1 parts by mass bis(2,4-di-t-butylphenyl)pentaerythritol 32iphosphate are used for 100 parts by mass polyamide, in particular polyamide 6 or polyamide 66, and 5 to 200 parts by mass, preferably 15 to 160 parts by mass, particularly preferably 30 to 150 parts by mass glass fibers.

The invention preferably relates to the use of bis(2,4-di-t-butylphenyl)pentaerythritol 32iphosphate in combination with at least one aromatic amine for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C. Preferably, 4,4'-bis(α,α'-dimethylbenzyl)diphenylamine is used as the aromatic amine.

The invention very particularly preferably relates to the use of bis(2,4-di-t-butylphenyl)pentaerythritol 32iphosphate in combination with at least one aromatic amine for producing polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C., with the proviso that 0.01 to 3 parts by mass, preferably 0.05 to 1 parts by mass bis(2,4-di-t-butylphenyl)pentaerythritol 32iphosphate are used for 100 parts by mass polyamide, in particular polyamide 6 or polyamide 66, and 5 to 200 parts by mass, preferably 15 to 160 parts by mass, particularly preferably 30 to 150 parts by mass glass fibers. Preferably, 4,4'-bis(α,α'-dimethylbenzyl)diphenylamine is used as the aromatic amine.

The invention preferably relates to the use of bis(2,4-di-t-butylphenyl)pentaerythritol 33iphosphate in combination with at least one aromatic amine and at least one phosphinic acid derivative of general formula (I)

wherein R stands for a hydrogen atom or for an alkyl, cycloalkyl, or aryl group, and R' stands for an alkali metal, an alkaline earth metal, a metal of the 12$^{th}$ or 13$^{th}$ group of the periodic system of the elements, an ammonium ion, or for a $C_1$-$C_{10}$ alkyl group, for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C. Preferably, 4,4'-bis(α,α'-dimethylbenzyl)diphenylamine is used as the aromatic amine and sodium hypophosphite or sodium hypophosphite monohydrate is used as the phosphinic acid derivative.

The invention very particularly preferably relates to the use of bis(2,4-di-t-butylphenyl)pentaerythritol 33iphosphate in combination with at least one aromatic amine and at least one phosphinic acid derivative of general formula (I)

wherein R stands for a hydrogen atom or for an alkyl, cycloalkyl, or aryl group, and R' stands for an alkali metal, an alkaline earth metal, a metal of the 12$^{th}$ or 13$^{th}$ group of the periodic system of the elements, an ammonium ion, or for a $C_1$-$C_{10}$ alkyl group, for producing polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C., with the proviso that 0.01 to 3 parts by mass, preferably 0.05 to 1 parts by mass bis(2,4-di-t-butylphenyl)pentaerythritol 34iphosphate, for 100 parts by mass polyamide, in particular polyamide 6 or polyamide 66, 5 to 200 parts by mass, preferably 15 to 160 parts by mass, particularly preferably 30 to 150 parts by mass, of glass fibers, 0.1 to 3 parts by mass, preferably 0.3 to 2 parts by mass, particularly preferably 0.35 to 1.5 parts by mass of the aromatic amine, in particular 4,4'-bis(α,α'-dimethylbenzyl)diphenylamine, and 0.01 to 3 parts by mass, preferably 0.05 to 2 parts by mass, particularly preferably 0.1 to 1.7 parts by mass of the phosphinic acid derivative, in particular sodium hypophosphite or sodium hypophosphite monohydrate, are used.

The invention very particularly preferably relates to the use of bis(2,4-di-t-butylphenyl)pentaerythritol 34iphosphate in combination with 4,4'-bis(α,α'-dimethylbenzyl)diphenylamine and sodium hypophosphite or sodium hypophosphite monohydrate for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C.

The invention very particularly preferably relates to the use of bis(2,4-di-t-butylphenyl)pentaerythritol 34iphosphate in combination with 4,4'-bis(α,α'-dimethylbenzyl)diphenylamine and sodium hypophosphite or sodium hypophosphite monohydrate for producing glass-fiber-reinforced polyamide-based products with low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or the elongation at fracture measured according to ISO 527 after hot air aging over 500 hours at 150° C. with the proviso that 0.01 to 3 parts by mass, preferably 0.05 to 1 parts by mass bis(2,4-di-t-butylphenyl)pentaerythritol 35iphosphate, for 100 parts by mass polyamide 6 or polyamide 66, 5 to 200 parts by mass, preferably 15 to 160 parts by mass, particularly preferably 30 to 150 parts by mass, of glass fibers, 0.1 to 3 parts by mass, preferably 0.3 to 2 parts by mass, particularly preferably 0.35 to 1.5 parts by mass of 4,4'-bis(α,α'-dimethylbenzyl)diphenylamine, and 0.01 to 3 parts by mass, preferably 0.05 to 2 parts by mass, particularly preferably 0.1 to 1.7 parts by mass of sodium hypophosphite or sodium hypophosphite monohydrate, are used.

For clarification, it is to be noted that the uses according to the invention also comprise all definitions and parameters listed for the compositions and/or polyamide-based products and mentioned generally or in preferred ranges in any combinations.

Particularly Preferred Methods

The invention preferably relates to a method for reducing the color change ΔE calculated according to DIN EN ISO 11664-4 over 500 hours at 150° C. and/or for reducing a color change ΔE calculated according to DIN EN ISO 11664-4 after UV irradiation according to DIN ISO 4892-2A over 200 hours at 80° C., 340 nm, and 1.55 W/m² without rain and/or for retaining the impact resistance to be determined according to ISO180-1U and/or for retaining the elongation at fracture to be determined according to ISO 527 after hot air aging over 500 hours at 1400 in glass-fiber-reinforced polyamide-based products, in that mixtures containing b) 0.1 to 3 parts by mass, preferably 0.3 to 2 parts by mass, particularly preferably 0.35 to 1.5 parts by mass of at least one secondary aromatic amine and c) 0.01 to 3 parts by mass, preferably 0.05 to 2 parts by mass, particularly preferably 0.1 to 1.7 parts by mass of at least one phosphinic acid derivative of general formula (I)

wherein R stands for a hydrogen atom or for an alkyl, cycloalkyl, or aryl group, and R' stands for an alkali metal, an alkaline earth metal, a metal of the 12th or 13th group of the periodic system of the elements, an ammonium ion, or for a $C_1$-$C_{10}$ alkyl group, and d) 0.01 to 3 parts by mass, preferably 0.05 to 1 parts by mass bis(2,4-di-t-butylphenyl)pentaerythritol diphosphite, are used for 100 parts by mass polyamide 6 or polyamide 66 and 5 to 200 parts by mass, preferably 15 to 160 parts by mass, particularly preferably 30 to 150 parts by mass glass fibers.

The ammonium ion $NH_4^+$ for R' in formula (I) is also a cation, which forms salts with anions similarly to alkali metal ions, in the case of methods according to the invention. It is the conjugated acid to the base ammonia ($NH_3$).

If R in formula (I) represents a hydrogen atom, it is hypophosphoric acid, if R represents an alkyl, cycloalkyl, or aryl group, it is a phosphinic acid, wherein the alkyl, cycloalkyl, or aryl group preferably comprises up to 12 carbon atoms.

If R in formula (I) represents an alkyl, cycloalkyl, or aryl group, salts and esters of the phosphinic acid are preferably used. Salts of the phosphinic acid are preferably used, wherein these can also be hydrates of the salts. Alkali and alkaline earth metal salts as well as metal salts of the 12th and 13th group of the periodic system of the phosphinic acid are very particularly preferred, wherein these can also be hydrates of the salts.

If R in formula (I) is a hydrogen atom, it is hypophosphoric acid. Salts and esters of the hypophosphoric acid are preferably used. Alkali and alkaline earth metal salts as well as metal salts of the 12th and 13th group of the periodic system of the hypophosphoric acid are particularly preferably used. Alkali metal salts of the hypophosphoric acid are particularly preferably used, wherein these can also be hydrates of the salts.

Good aging behavior in the case of methods according to the invention in the form of improved color retention or improved color stability after hot air aging is also to be understood to mean that the resulting color distance ΔE calculated according to DIN EN ISO 11664-4 after hot air storage over 500 hours at 150° C. is less, preferably the color distance ΔE is in the range of 0 to 20, particularly preferably the color distance ΔE is in the range of 0 to 15. Good aging behavior in the form of improved UV stability is understood in the case of methods according to the invention to mean that the color distance ΔE calculated according to DIN EN ISO 11664-4 after UV storage according to DIN ISO 4892-2A over 200 hours at 80° C., 340 nm, and 1.55 W/m² without rain is less, preferably the color distance ΔE is in the range of 0 to 30, particularly preferably the color distance ΔE is in the range of 0 to 20.

Good aging behavior in the form of a sufficient retention of the impact resistance after hot air aging is understood in the case of methods according to the invention to mean that the impact resistance of a sample measured according to ISO180-1U after hot air aging over 500 hours at 150° C. does not drop more than 50% in comparison to the time at 0 hours.

Good aging behavior in the form of a sufficient retention of the elongation at fracture after hot air aging is understood in the case of methods according to the invention to mean that the elongation at fracture measured according to DIN EN ISO 527 after hot air aging over 500 hours at 150° C. does not drop more than 30% in comparison to the time at 0 hours.

Finally, the invention particularly preferably relates to a method for reducing the color change ΔE calculated according to DIN EN ISO 11664-4 over 500 hours at 150° C. and/or for reducing a color change ΔE calculated according to DIN EN ISO 11664-4 after UV irradiation according to DIN ISO 4892-2A over 200 hours at 80° C., 340 nm, and 1.55 W/m² without rain and/or for retaining the impact resistance to be determined according to ISO180-1U and/or for retaining the elongation at fracture to be determined according to ISO 527 after hot air aging over 500 hours at 150° C. in glass-fiber-reinforced polyamide-based products, in that mixtures containing b) 0.1 to 3 parts by mass, preferably 0.3 to 2 parts by mass, particularly preferably 0.35 to 1.5 parts by mass 4,4'-bis(α,α'-dimethylbenzyl)diphenylamine, c) 0.01 to 3 parts by mass, preferably 0.05 to 2 parts by mass, particularly preferably 0.1 to 1.7 parts by mass sodium hypophosphite or sodium hypophosphite monohydrate, and d) 0.01 to 3 parts by mass, preferably 0.05 to 1 parts by mass bis(2,4-di-t-butylphenyl)pentaerythritol diphosphite, are used for 100 parts by mass polyamide 6 or polyamide 66 and 5 to 200 parts by mass, preferably 15 to 160 parts by mass, particularly preferably 30 to 150 parts by mass glass fibers.

For clarification, it is to be noted that the methods according to the invention also comprise all definitions and parameters listed for the compositions and polyamide-based products and mentioned generally or in preferred ranges in any combinations.

The subject matter of the present application is also the use or processing of the molding compounds to be produced from the components to be used according to the invention in the extrusion process, in the blow molding method, or in injection molding for producing products, preferably molded parts or semifinished products, in particular by means of injection molding.

Processing methods according to the invention for producing products by means of extrusion, blow molding, or injection molding are carried out at melt temperatures in the range of 230 to 330° C., preferably of 250 to 300° C., and possibly additionally at pressures of at most 2500 bar, preferably at pressures of at most 2000 bar, particularly preferably at pressures of at most 1500 bar, and very particularly preferably at pressures of at most 750 bar.

In extrusion, also referred to as extrusion molding, solid to viscous curable thermoplastic molding compounds under pressure are continuously pressed out of a forming opening, preferably designated as a nozzle, die, or mouthpiece. Products having the cross section of the opening result here in theoretically arbitrary length (http://de.wikipedia.org/wiki/Extrusion_(Verfahrenstechnik). The fundamental method steps of the profile extrusion method, a method form of extrusion, are:

1. Plasticizing and providing the thermoplastic melt in an extruder,
2. Extruding the thermoplastic melt strand through a calibration sleeve, which has the cross section of the profile to be extruded,
3. Cooling the extruded profile in a calibration table,
4. Further transporting the profile using a draw-off after the calibration table,
5. Cutting the previously endless profile to length in a cutting facility,
6. Collecting the profiles cut to length on a collecting table.

The profile extrusion of polyamide 6 and polyamide 66 is described in Kunststoff-Handbuch 3/4, Polyamide [Plastic handbook 3/4, Polyamides], Carl Hanser Verlag, Munich 1998, pages 374-384.

The method of blow molding is described, for example, in http://www.blasformen.com/. In blow molding, in the first method step, plastic granules are drawn in, compacted, degassed, heated, plasticized, and homogenized to form a plasticized plastic strand by means of a heated extruder. In the next step, the plastic compound is guided into a tube head flanged onto the extruder. The plastic melt is formed there into a tube, which emerges downward vertically from a nozzle. The tube diameter is adapted to the article to be manufactured using standard mandrels and nozzles of different sizes, which are flanged onto the tube head. The tube thickness and the weight resulting therefrom of the blow-molded parts is predetermined by the selection of different diameter differences from mandrel to nozzle.

Injection molding is distinguished in that the raw material, thus the thermoplastic molding compound to be processed containing the components to be used according to the invention, preferably in the form of granules, is melted (plasticized) in a heated cylindrical cavity and injected as an injection compound under pressure into a temperature-controlled cavity. After the cooling (solidification) of the compound, the injection-molded part is demolded.

A distinction is made between
1. Plasticizing/melting
2. Injection phase (filling process)

3. Holding pressure phase (due to thermal contraction during the crystallization)
4. Demolding.

An injection molding machine consists of a closing unit, the injection unit, the drive, and the controller. The closing unit includes fixed and movable clamping plates for the tool, an end plate, and columns and drive of the movable tool clamping plate (toggle joint or hydraulic closing unit).

An injection unit comprises the electrically heatable cylinder, the drive of the screw (motor, gear), and the hydraulics for displacing the screw and injection unit. The task of the injection unit is to melt, meter, inject, and exert holding pressure on (due to contraction) the powder or the granules. The problem of the backflow of the melt within the screw (leakage flow) is solved by backflow barriers.

In the injection molding tool, the inflowing melt of the molding compound to be processed and containing the components to be used according to the invention is dissolved, cooled, and thus the component to be manufactured is manufactured. At least two tool halves are always required for this purpose. A distinction is made between the following functional complexes in injection molding:
gate system
mold-forming inserts
venting
machine and force accommodation
demolding system and movement transfer
temperature control In contrast to injection molding, in extrusion, an endlessly molded strand made of the molding compound to be used according to the invention is used in the extruder, wherein the extruder is a machine for producing products on the basis of thermoplastic molded parts. A distinction is made between single-screw extruder and double-screw extruder as well as the respective subgroups, conventional single-screw extruder, active-conveyor single-screw extruder, counter-direction double-screw extruder, and synchronized double-screw extruder.

Extrusion facilities for producing profiles consist of: extruder, profile tool, calibration, cooling line, caterpillar and roller draw-off, severing device, and tipping trough.

The present invention therefore also relates to products, preferably molded parts, molded bodies, or semifinished products, obtainable by extrusion or injection molding of the molding compounds according to the invention containing at least the components a), b), c), d), and e) and possibly f) and possibly g).

The preparation of compositions to be used according to the invention for the production of molding compounds to be used in injection molding, in extrusion, or for blow molding is carried out by mixing the individual components a), b), c), d), and e) and possibly further components in at least one mixing assembly, preferably a compounder, particularly preferably a two-shaft extruder rotating in the same direction. By way of this mixing process, also referred to as compounding, molding compounds are obtained as intermediate products which are provided for further processing in the form of powders, granules, or in strand form. These molding compounds—also referred to as thermoplastic molding compounds—can either consist exclusively of the components a), b), c), d), and e), or possibly can contain further components, preferably f) and/or g).

Finally, the present invention also relates to the use of the products, preferably molded parts, molded bodies, or semifinished products, produced by extrusion or injection molding from molding compounds, containing at least the components a), b), c), d), and e) and possibly f) and possibly g), for electrical or electronic components. These products according to the invention can preferably be used in the motor vehicle, electrical, electronic, telecommunication, solar, information technology, and computer industries, in the domestic, sport, in medicine, or in the entertainment industry. In particular, products according to the invention can be used for applications in which long-term color stability is required. The use for molded parts in electrical engineering and in vehicles is preferred for such applications, in particular high-voltage components in vehicles, in particular in motor vehicles.

EXAMPLES

To substantiate the improvements of the properties described according to the invention, initially corresponding polyamide-based polymer compositions were manufactured by compounding. The individual components were mixed for this purpose in a two-shaft extruder (ZSK 26 Compounder from Coperion Werner & Pfleiderer (Stuttgart, Germany)) at temperatures in the range of 270 and 300° C., discharged as a strand, cooled until they could be granulated, and granulated. After the drying (generally two days at 80° C. in the vacuum drying cabinet), the granules were processed at temperatures in the range of 270 to 290° C. to form standard test specimens for the respective tests.

The impact resistance according to ISO 180-1U (Izod) and the elongation at fracture according to ISO 527 were determined on injection-molded test specimens defined according to DIN EN ISO 1874-2 in the freshly injected state at 23° C. The freshly molded state, also "dry as molded", is defined in DIN EN ISO 1874-2.

The Lab color space (also: CIELAB, CIEL*a*b*, Lab colors) describes all perceptible colors. It uses a three-dimensional color space, in which the brightness value L is perpendicular to the color plane (a, b). The L* axis describes the brightness (luminance) of the color with values from 0 to 100. In the illustration, this is at the zero point perpendicular to the a*b* plane. It can also be referred to as the neutral gray axis, because all achromatic colors (grayscales) are contained between the endpoints black (L*=0) and white (L*=100). In analogy to the complementary color theory of Ewald Hering, the a coordinate specifies the color type and color intensity between green and red and the b coordinate specifies the color type and the color intensity between blue and yellow. The greater the positive a and b and the smaller the negative a and b values, the more intensive the color tone. If a=0 and b=0, an achromatic color tone is present on the brightness axis. In the typical software implementations, L can assume values between 0 and 100 and a and b can be varied between −128 and 127. The discoloration of polymer-based products by the oxidative damage of the polymer matrix was determined in the scope of the present invention by the measurement of the color distance ΔE over the storage time at high temperature. The color distance ΔE between two color stimuli was calculated according to the equation $\Delta E=[(\Delta L^*)^2+(\Delta a^*)^2+(\Delta b^*)^2]^{1/2}$ according to DIN EN ISO 11664-4.

In the scope of the present invention, the testing of the aging behavior in the form of improved color retention or improved color stability was carried out by storing injection-molded polyamide-based slabs of 60 mm·40 mm·4 mm in a material testing cabinet of the model Binder FP115 with circulating air at temperatures of 150° C., also referred to in the scope of the present invention as hot air aging. As the measure of the discoloration, the color distance ΔE of injection-molded products based on compositions according to the invention after hot air aging over 500 hours was determined before and after hot air aging by the measurement of the color values L*a*b*.

$$\Delta E = \left[(\Delta L^*)^2 + (\Delta a^*)^2 + (\Delta b^*)^2\right]^{1/2}$$

Therefore, according to the invention, good aging behavior in the form of improved color retention or improved color stability after hot air aging is distinguished in that the color change ΔE in the case of products according to the invention is less than in the case of products according to the comparative examples. The color values L*a*b* of the specimens were determined in the scope of the present invention on slabs having the dimensions 60 mm·40 mm·4 mm and the color distance ΔE was calculated therefrom according to DIN EN ISO 11664-4. The color measurement was carried out here using the spectrophotometer CM-2600d from Konica Minolta using the CIE standard light type D65 in reflection (100 observer angle) with gloss exclusion (SCE=Specular Component Excluded).

In the scope of the present invention, the testing of the aging behavior with respect to products based on the compositions according to the invention in the form of improved UV stability was carried out by storing injection-molded slabs having the dimensions 60 mm 40 mm·4 mm in a QUV rapid weathering device from Q-Lab according to DIN ISO 4892-2A over 200 hours at 80° C., 340 nm, and 1.55 W/m² without rain, designated hereinafter as UV storage. As the measure of the discoloration, in the scope of the present invention, the color distance ΔE of injection-molded products based on compositions according to the invention was determined before and after UV storage for 200 hours by the measurement of the color values L*a*b*.

$$\Delta E = \left[(\Delta L^*)^2 + (\Delta a^*)^2 + (\Delta b^*)^2\right]^{1/2}$$

Therefore, according to the invention, good aging behavior in the form of improved UV stability after UV storage is distinguished in that the color change ΔE in the case of products according to the invention was less in comparison to products without component d). The color values L*a*b* of the specimens were determined in the scope of the present invention on slabs having the dimensions 60 mm·40 mm·4 mm and the color distance ΔE was calculated therefrom according to DIN EN ISO 11664-4.

In the scope of the present invention, the testing of the aging behavior in the form of retention of the impact resistance and the elongation at fracture was carried out by storing injection-molded test specimens defined according to DIN EN ISO 1874-2 in a material testing cabinet of the model Binder FP115 with circulating air at temperatures of 150° C. The impact resistance was determined according to ISO 180-1U and the elongation at fracture was determined according to ISO 527 at 23° C. on these test specimens before and after storage over 500 hours at 150° C.

Educts:
Component a) polyamide 6 (Durethan® B29, Lanxess Deutschland GmbH)
Component b) 4,4'-bis(α,α-dimethylbenzyl)diphenylamine, CAS No. 10081-67-1 (Rianox® 445 from Rialon Cooperation)
Component c) anhydrous sodium hypophosphite CAS No. 7681-53-0 (Sigma Aldrich, extra pure)
Component d) Ultranox® 626A, CAS No. 26741-53-7 (Brenntag)
Component e) glass fibers (CS7928, Lanxess Deutschland GmbH)

TABLE 1

|  |  | Ex. 1 | Comparison 1 | Comparison 2 |
|---|---|---|---|---|
| Component a) | weight % | 68.5 | 69 | 70 |
| Component b) | weight % | 0.3 | 0.8 | 0 |
| Component c) | weight % | 1.0 | 0.2 | 0 |
| Component d) | weight % | 0.2 | 0 | 0 |
| Component e) | weight % | 30 | 30 | 30 |
| Color change ΔE after hot air aging 500 hours, 150° C. |  | 15 | 21 | 40 |
| Color change ΔE after weathering 200 hours, 80° C., 340 nm, and 1.55 W/m² |  | 14 | 34 | 5 |
| Retention of the impact resistance ISO180-1U, 23° C., after hot air aging 500 hours, 150° C. | % | 55 | 57 | 41 |
| Retention of the elongation at fracture ISO527, 23° C., after hot air aging 500 hours, 150° C. | % | 98 | 86 | 67 |

The results in Table 1 show that products based on compositions according to the invention according to example 1, in comparison to comparative example 1, in which component d) was not used, surprisingly had a higher UV stability in the form of a lower color change ΔE after weathering for 200 hours at 80° C., 340 nm, and 1.55 W/m² in the range ΔE<20. A smaller ΔE value in the scope of the present invention means a small color change. If the color were not to change at all after the storage, ΔE=0 would be the result.

Moreover, improved aging behavior was surprisingly shown for example 1 in the form of improved color retention or improved color stability after hot air aging over 500 hours at 150° C. with ΔE between ΔE=0 and 15 in comparison to comparative example 1 without component d). At the same time, the retention of the impact resistance and the elongation at fracture after hot air aging at 150° C. for 500 hours was improved in comparison to comparative example 1 without component d). The improvements mentioned in example 1 also apply in comparison to comparative example 2, in which none of components b), c), d), and e) were used.

The invention claimed is:
1. A flame-retardant composition comprising:
a) at least one polyamide (PA) selected from the group consisting of PA6, PA6.6, PA4.6, PA6T/6, PA6T/66, PA6T/6I and PA6T/6I/66,
b) at least one secondary aromatic amine,
c) at least one phosphinic acid derivative of the general formula (I),

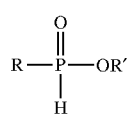

(I)

wherein R stands for a hydrogen atom or for an alkyl, cycloalkyl, or aryl group, and R' stands for an alkali metal, an alkaline earth metal, a metal of the 12th and 13th group of the periodic system of the elements, an ammonium ion, or for a $C_1$-$C_{10}$ alkyl group, d) bis(2,4-di-t-butylphenyl)pentaerythritol diphosphite, e) glass fibers, and f) at least one halogen-free flame retardant, with the proviso that for 100 parts by mass of component a), the composition comprises:

0.1 to 3 parts by mass of the component b), 0.01 to 3 parts by mass of the component c), 0.01 to 3 parts by mass of the component d), 5 to 200 parts by mass of the component e), and 3 to 100 parts by mass of the component f), wherein the composition is free of antimony trioxide, antimony pentoxide, antimony oxide-doped mica and antimony tin oxide.

2. The composition according to claim 1, wherein the component b) comprises at least one secondary aromatic amine of the general formula (II):

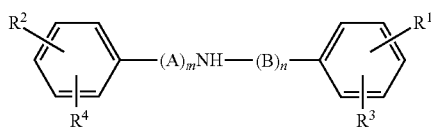

wherein m and n each independently of one another stand for 0 or 1,

A and B each independently of one another stand for a tertiary C atom substituted with $C_1$-$C_4$-alkyl or phenyl, $R^1$ and $R^2$ each independently of one another stand for hydrogen, for a $C_1$-$C_6$-alkyl group in ortho and para position, which can possibly be substituted by 1 to 3 phenyl radicals, or for halogen, carboxyl, or a metal salt of this carboxyl group, $R^3$ and $R^4$ each independently of one another stand for hydrogen or for a methyl radical in ortho and para position, or stand for a tertiary $C_3$-$C_9$-alkyl group in ortho or para position, which can possibly be substituted by 1 to 3 phenyl radicals.

3. The composition according to claim 1, wherein the at least one secondary aromatic amine of the component b) is selected from the group consisting of:

4,4'-bis(α,α'-tertiaryoctyl)diphenylamine, 4,4'-bis(α,α'-dimethylbenzyl)diphenylamine, 4-(1,1,3,3-tetramethylbutyl)4'triphenylmethyldiphenylamine, 4,4'-bis(α,α'-p-trimethylbenzyl)diphenylamine, 2,4,4'-tris(α,α'-p-trimethylbenzyl)diphenylamine, 2,2'-dibromo,4,4'-bis(α,α'-dimethylbenzyl)diphenylamine, 4,4'-bis(α,α-dimethylbenzyl)-2-carboxydiphenylamine-nickel-4,4'-bis(α,α-dimethylbenzyl)-diphenylamine, 2-sec-butyl-4,4'-bis(α,α-dimethylbenzyl)diphenylamine, 4,4-bis(α,α-dimethylbenzyl)-2-(α-methlheptyl)diphenylamine, 2-(α-methylpentyl)4,4-ditrityldiphenylamine, 4-α,α-dimethylbenzyl-4'-isopropoxydiphenylamine, 2-(α-methylheptyl)-4'-(α,α-dimethylbenzyl)diphenylamine, 2-(α-methylpentyl)-4'-trityldiphenylamine, 4,4'-bis(tertiary-butyl)diphenylamine,

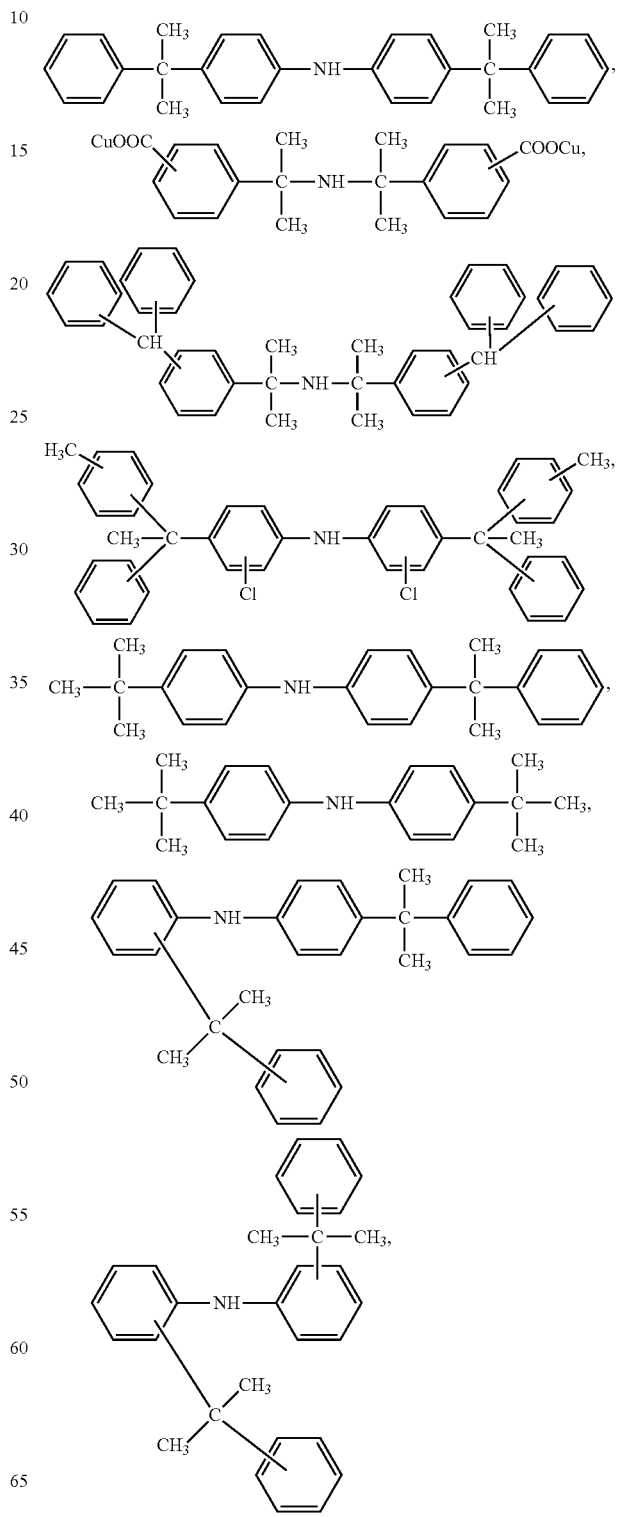

-continued

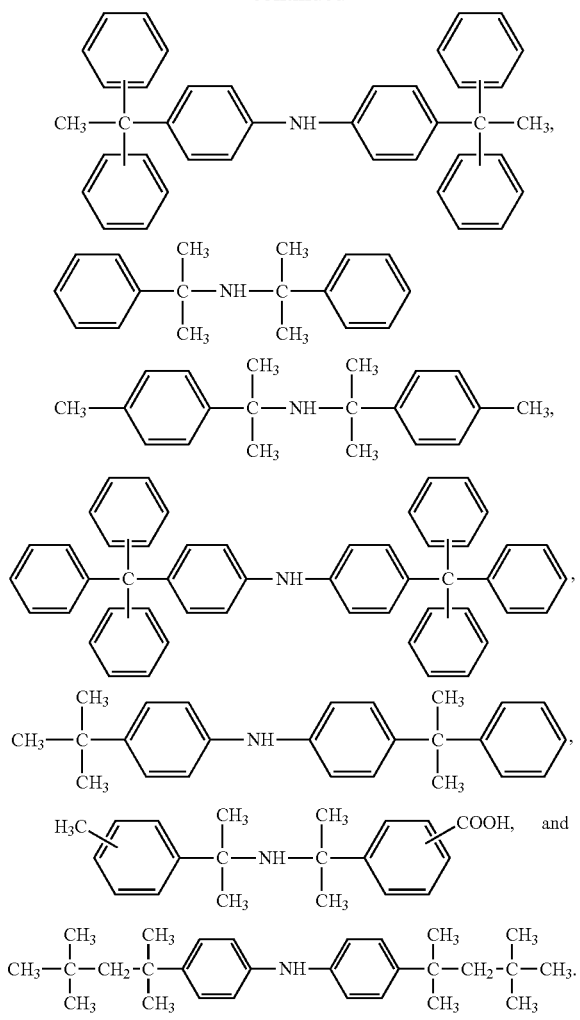

4. The composition according to claim 1, wherein the at least one secondary aromatic amine of the component b) comprises 4,4'-bis(α,α'-dimethylbenzyl)diphenylamine.

5. The composition according to claim 1, wherein the at least one phosphinic acid derivative of the component c) is selected from the group consisting of salts of phosphinic acid and hydrates thereof.

6. The composition according to claim 1, wherein the at least one phosphinic acid derivative of the component c) is selected from the group consisting of alkali and alkaline earth metal salts and metal salts of the 12th or 13th group of the periodic system of phosphinic acid and hydrates thereof.

7. The composition according to claim 1, wherein the at least one phosphinic acid of the component c) is sodium hypophosphite or sodium hypophosphite monohydrate.

8. The composition according to claim 1, wherein
the component a) comprises polyamide 6 or polyamide 66,
the component b) comprises 4,4'-bis(α,α'-dimethylbenzyl)diphenylamine,
the component c) comprises sodium hypophosphite or sodium hypophosphite monohydrate, and
the component d) comprises bis(2,4-di-t-butylphenyl) pentaerythritol diphosphite.

9. A glass fiber-reinforced product which comprises the composition according to claim 1.

10. The glass fiber-reinforced product according to claim 9, wherein the product has a low color change ΔE calculated according to DIN EN ISO 11664-4 after hot air storage over 500 hours at 150° C. and/or low color change ΔE calculated according to DIN EN ISO 11664-4 after UV storage according to DIN ISO 4892-2A over 200 hours at 80° C., 340 nm, and 1.55 W/m² without rain and/or retention of the impact resistance measured according to ISO180-1U and/or retention of the elongation at fracture measured according to ISO 527 after hot air aging over 500 hours at 150° C.

11. The glass fiber-reinforced product according to claim 9, wherein the product is an orange colored product having a color tone of a color number beginning with "2" of the RAL color table within a color distance ΔE<20 in the L*a*b* system as defined in EN ISO 11664-4.

12. The glass fiber-reinforced product according to claim 9, wherein
the component a) comprises PA6 or PA66,
the component b) comprises 4,4'-bis(α,α'-dimethylbenzyl)diphenylamine, and
the component c) comprises sodium hypophosphite or sodium hypophosphite monohydrate.

* * * * *